(12) United States Patent
Vassilovski et al.

(10) Patent No.: US 11,490,231 B2
(45) Date of Patent: Nov. 1, 2022

(54) V2X CONGESTION-SENSITIVE PREEMPTIVE DATA DOWNLOAD REQUEST

(71) Applicant: QUALCOMM Incorporated, San Diego, CA (US)

(72) Inventors: Dan Vassilovski, Del Mar, CA (US); Bala Ramasamy, San Diego, CA (US); Edwin Chongwoo Park, San Diego, CA (US); Benjamin Lund, Escondido, CA (US); Soumya Das, San Diego, CA (US); Justin Tse, Poway, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/167,900

(22) Filed: Feb. 4, 2021

(65) Prior Publication Data

US 2022/0053302 A1 Feb. 17, 2022

Related U.S. Application Data

(60) Provisional application No. 63/065,894, filed on Aug. 14, 2020.

(51) Int. Cl.
*H04W 4/40* (2018.01)
*H04W 4/18* (2009.01)

(52) U.S. Cl.
CPC ............... *H04W 4/18* (2013.01); *H04W 4/40* (2018.02)

(58) Field of Classification Search
CPC .......... H04W 4/18; H04W 4/40; H04W 4/44; H04W 4/46; H04W 4/023; H04W 4/029;
(Continued)

(56) References Cited

U.S. PATENT DOCUMENTS

| 6,898,432 B1 * | 5/2005 | Jiang | H04W 4/029 455/552.1 |
| 2007/0089110 A1 * | 4/2007 | Li | H04L 67/2847 717/178 |

(Continued)

FOREIGN PATENT DOCUMENTS

| EP | 1209930 A2 | 5/2002 |
| WO | 2019036578 A1 | 2/2019 |
| WO | 2020033088 A1 | 2/2020 |

OTHER PUBLICATIONS

International Search Report and Written Opinion—PCT/US2021/042212—ISA/EPO—dated Nov. 2, 2021
(Continued)

*Primary Examiner* — Marcus Hammonds
(74) *Attorney, Agent, or Firm* — Campbell Chiang; Sunstein LLP

(57) ABSTRACT

Techniques are provided for responding to congestion-sensitive preemptive data download requests in a V2X network. An example method for downloading data on a mobile device includes determining an estimated time of arrival at a station based at least in part on almanac information, generating a data download request based at least in part on the estimated time of arrival at the station, transmitting the data download request, and receiving one or more data packets from the station based on the data download request.

38 Claims, 19 Drawing Sheets

(58) Field of Classification Search
CPC .... H04W 4/021; H04L 67/5681; H04L 67/12; H04L 67/06
See application file for complete search history.

(56) References Cited

U.S. PATENT DOCUMENTS

| | | | |
|---|---|---|---|
| 2014/0250468 A1* | 9/2014 | Barr | H04W 36/32 725/62 |
| 2018/0310349 A1* | 10/2018 | Wang | H04L 67/2842 |
| 2019/0306912 A1 | 10/2019 | Cheng et al. | |
| 2019/0364492 A1* | 11/2019 | Azizi | H04W 68/005 |
| 2021/0219168 A1* | 7/2021 | Liu | H04W 40/22 |

OTHER PUBLICATIONS

Masmoudi A., et al., "A Survey on Radio Resource Allocation for V2X Communication", Wireless Communications and Mobile Computing, vol. 2019, Article ID: 2430656, pp. 1-12.

\* cited by examiner

V2X CONGESTION-SENSITIVE PREEMPTIVE DATA DOWNLOAD REQUEST

CROSS-REFERENCE TO RELATED APPLICATION

This application claims the benefit U.S. Provisional Application No. 63/065,894, filed Aug. 14, 2020, entitled "V2X CONGESTION-SENSITIVE PREEMPTIVE DATA DOWNLOAD REQUEST," the entire contents of which are hereby incorporated herein by reference for all purposes.

BACKGROUND

The connected-vehicle radio-frequency environment is a spectrum-limited, bandwidth-limited resource. For example, the available spectrum may be about 20 MHz at just under 6 GHz. This spectrum may be increasingly used as more radio-frequency-based connected-vehicle (e.g., vehicle to everything (V2X)) message exchanges occur. V2X may utilize several wireless technologies such as cellular, dedicated short range communications (DSRC), and other vehicular communication systems to exchange information between vehicles and other entities, to include roadside units (RSUs) and edge servers. Applications running on mobile devices are increasingly dependent on high-data rate services. For example, users may be able to view media data such as television and movies, as well as participate in video conference calls and networked based gaming. Mobile users may be concentrated in an area such as in a public transportation carrier (e.g., bus, train), or in an area of traffic congestion. Requests for high-data rate services from multiple mobile devices in a congested area can place large demands on a cellular network. The increased data demands may cause a degradation in the user experience in high-data rate application due to latency issues, reduced resolution video, and failed connections.

SUMMARY

An example method for downloading data on a mobile device according to the disclosure includes determining an estimated time of arrival at a first station based at least in part on almanac information, generating a data download request based at least in part on the estimated time of arrival at the first station, transmitting the data download request, and receiving one or more data packets from the first station based on the data download request.

Implementations of such a method may include one or more of the following features. The almanac information may be obtained from a network. The method may further includes determining a data transfer gap duration based at least in part on the estimated time of arrival at the first station, determining a data storage requirement based at least in part on the gap duration, and generating the data download request based at least in part on the data storage requirement. The data storage requirement may be based at least in part on an amount of data consumed by an application executing on the mobile device. The amount of data consumed by the application may be based on a bit rate associated with a file type. The data download request may be transmitted to the first station. The data download request may be transmitted via a Uu interface. The data download request may be transmitted via a sidelink interface. The one or more data packets may be received via a PC5 interface. The one or more data packets may be at least a first portion of a first media file. The method may further include determining an estimated time of arrival at a second station based at least in part on the almanac information, generating a second data download request based at least in part on the estimated time of arrival at the second station, transmitting the second data download request, and receiving one or more data packets from the second station based on the second data download request, wherein the one or more data packets are at least a second portion of the first media file. The second data download request may be transmitted to the second station. The data download request may include a priority value. The priority value may be based at least in part on an amount of unconsumed media file on the mobile device. The method may also include storing the one or more data packets in a memory, and displaying an indicator based on the one or more data packets stored in the memory.

An example apparatus according to the disclosure includes a memory, at least one transceiver, at least one processor communicatively coupled to the memory and the at least one transceiver and configured to determine an estimated time of arrival at a first station based at least in part on almanac information, generate a data download request based at least in part on the estimated time of arrival at the first station, transmit the data download request, and receive one or more data packets from the first station based on the data download request.

Implementations of such an apparatus may include one or more of the following features. The at least one processor may be further configured to obtain the almanac information from a network. The at least one processor may be further configured to determine a data transfer gap duration based at least in part on the estimated time of arrival at the station, determine a data storage requirement based at least in part on the gap duration, and generate the data download request based at least in part on the data storage requirement. The data storage requirement may be based at least in part on an amount of data consumed by an application executing on the apparatus. The amount of data consumed by the application may be based on a bit rate associated with a file type. The at least one processor may be configured to transmit the data download request to the station. The at least one processor may be configured to transmit the data download request via a Uu interface. The at least one processor may be configured to transmit the data download request via a sidelink interface. The at least one processor may be configured to receive the one or more data packets via a PC5 interface. The one or more data packets may be at least a first portion of a first media file. The at least one processor may be further configured to determine an estimated time of arrival at a second station based at least in part on the almanac information, generate a second data download request based at least in part on the estimated time of arrival at the second station, transmit the second data download request, and receive one or more data packets from the second station based on the second data download request, wherein the one or more data packets are at least a second portion of the first media file. The at least one processor may be configured to transmit the second data download request to the second station. The data download request may include a priority value. The priority value may be based at least in part on an amount of unconsumed media file on the apparatus. The at least one processor may be further configured to store the one or more data packets in the memory, and display an indicator based on the one or more data packets stored in the memory.

An example apparatus for downloading data on a mobile device according to the disclosure includes means for determining an estimated time of arrival at a first station based at least in part on almanac information, means for generating a data download request based at least in part on the estimated time of arrival at the first station, means for transmitting the data download request, and means for receiving one or more data packets from the first station based on the data download request.

An example non-transitory processor-readable storage medium comprising processor-readable instructions configured to cause one or more processors to download data on a mobile device according to the disclosure includes code for determining an estimated time of arrival at a station based at least in part on almanac information, code for generating a data download request based at least in part on the estimated time of arrival at the station, code for transmitting the data download request, and code for receiving one or more data packets from the station based on the data download request.

Items and/or techniques described herein may provide one or more of the following capabilities, as well as other capabilities not mentioned. A plurality of mobile devices may be conveyed in a multi-passenger vehicle or moving in a dynamic cluster. One or more of the mobile devices may request a data download from a network. A network server may receive planned route information associated with the mobile devices. The network server may preemptively generate a data distribution plan based on the data download requests and the planned route information. The data distribution plan may utilize multiple stations to deliver data packets to the mobile devices. The mobile device may be configured to generate data download requests based on gap durations along a route. The data packet deliveries may be scheduled based on the planned route. The data distribution plan may preserve network resources to maintain quality of service for delay intolerant applications. Bandwidth in a congested network may be conserved. The user experience for mobile applications may be increased. Other capabilities may be provided and the capabilities discussed. It may be possible for an effect noted above to be achieved by means other than that noted, and a noted item/technique may not necessarily yield the noted effect.

DETAILED DESCRIPTION

Techniques are discussed herein for responding to congestion-sensitive preemptive data download requests in a V2X network. Mobile devices are increasingly being used for high-data rate services while in-vehicles, including for television, movies and gaming. Often individual passengers within the same passenger vehicle (i.e., bus, subway, train, etc.) or other individuals in an area of traffic congestion, will download and view separate content. These data requests may place large demands on the cellular network, and as a result the user experience may be degraded along routes with lesser or limited service. The techniques discussed herein provide a mechanism to preemptively alert the network of an in-vehicle device request for data, along with knowledge of the vehicle planned route, to enable the network to segment the requested data, segregating or reserving the bulk of a download for either more favorable Wide Area Network (WAN) conditions or for non-WAN download via a direct link, such as with the PC5 interfaces at intersections or other locations where a vehicle is stopped near by a roadside unit (RSU). For example, a networked content server may be configured with one or more algorithms to enable a service provider to selectively and proactively allocate data download to a device based on the device location, motion state, intended destination, the type of data requested. This may be realized by combining network knowledge of data traffic conditions, device capability (WAN, sidelink), device intended travel route and current network conditions. The combination of information from a vehicle or device intended destination, along with knowledge of network capabilities and network conditions, enables a service provider to more efficiently use network resources and provide higher quality of service to end users.

Figure 1:
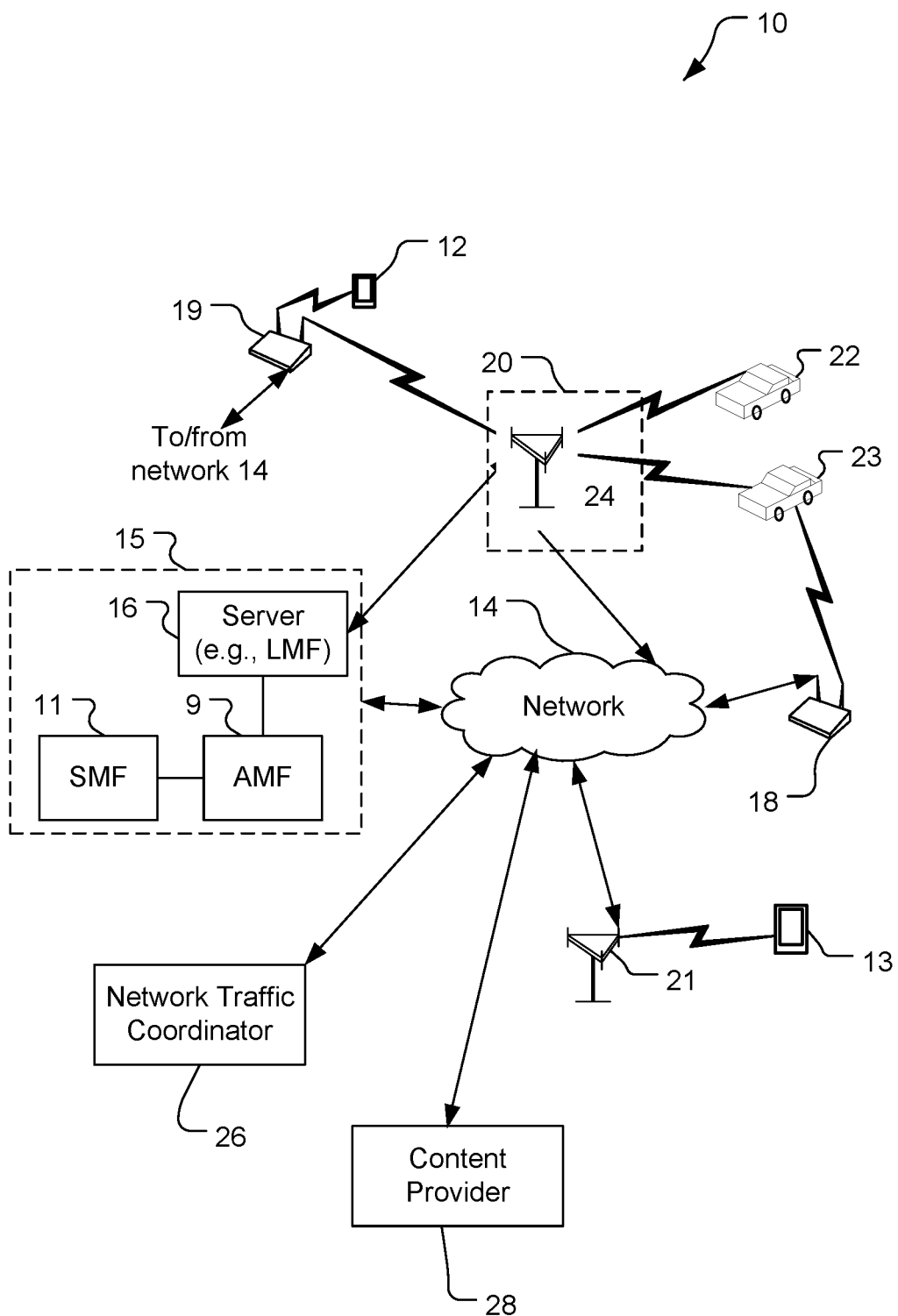
FIG. 1 is a schematic diagram of a connected-vehicle communication system.

Referring to FIG. 1, an example connected-vehicle communication system 10 includes UEs 12, 13, 22, 23, a network 14, a core network 15, access points (APs) 18, 19, a roadside unit (RSU) 20, a base transceiver station (BTS) 21, a network traffic coordinator (NTC) server 26, and a content provider 28. The core network 15 (e.g., a 5G core network (5GC)) includes back-end devices including, among other things, an Access and Mobility Management Function (AMF) 9, a Session Management Function (SMF) 11, and a server 16 communicatively coupled to the SMF 11 and the AMF 9. The server 16 may be an edge computing device (i.e., server) such as a Location Management Function (LMF) that supports positioning of the UEs 12, 13, 22, 23 (e.g., using techniques such as Assisted GNSS (A-GNSS), OTDOA (Observed Time Difference of Arrival, e.g., Downlink (DL) OTDOA and/or Uplink (UL) OTDOA), Round Trip Time (RTT), Multi-Cell RTT, RTK (Real Time Kinematic), PPP (Precise Point Positioning), DGNSS (Differential GNSS), E-CID (Enhanced Cell ID), AoA (Angle of Arrival), AoD (Angle of Departure), etc.). The LMF may also be referred to as a Location Manager (LM), a Location Function (LF), a commercial LMF (CLMF), or a value-added LMF (VLMF). The server 16 (e.g., an LMF), and/or the network, and/or the BTS 21, and/or a BTS 24 (e.g., a gNB) of the RSU 20, and/or the UE 12, 13, 22, 23 may be configured to determine location of the UE 12, 13, 22, 23. The server 16 may communicate directly with the BTS 24 (e.g., a gBNB), may be co-located with the BTS 24, and may be integrated with the BTS 24. The SMF 11 may serve as an initial contact point of a Service Control Function (SCF) (not shown) to create, control, and delete media sessions. In an example, the AMF 9 may serve as a control node that processes signaling between the UEs 12, 13, 22, 23 and the core network 15, and provides QoS (Quality of Service) flow and session management. The AMF 9 may support mobility of the UEs 12, 13, 22, 23 including cell change and handover and may participate in supporting signaling connection to the UEs 12, 13, 22, 23. The RSU 20 may include, as shown, the BTS 24 and one or more sensors, such as a camera (not shown in FIG. 1). The RSU 20 may be configured differently, e.g., may be a standard base station (e.g., not including the sensor(s)) such as a gNB, may be integrated into a base station such as a gNB, and/or may be integrated into another object or device (e.g., a light post, a building, a sign, etc.). The RSU 20 may be called roadside equipment (RSE) or other names. The RSU 20 may or may not be disposed in a vicinity (e.g., within wireless communication range) of a road and thus the term "roadside" does not limit a location of the RSU 20. The system 10 is capable of wireless communication in that components of the system 10 can communicate with one another (at least some times using wireless connections) directly or indirectly, e.g., via the network 14 and/or one or more of the access points 18 and the base transceiver station 21 (and/or one or more other devices not shown, such as one or more other RSUs and/or one or more other base transceiver stations). For indirect communications (e.g., communications through multiple entities), the communications may be altered during transmission from one entity to another, e.g., to alter header information of data packets, to change format, etc. The UEs 12, 13 shown are mobile wireless communication devices (although they may communicate wirelessly and via wired connections) including mobile phones (including smartphones) and a tablet computer. The UEs 22, 23 shown are vehicle-based mobile wireless communication devices (although they may communicate wirelessly and via wired connections). The UEs 22, 23 are shown as cars, but these are examples and numerous other configurations of the UEs 22, 23 may be used. For example, one or more of the UEs 22, 23 may be configured as a different type of vehicle such as a truck, a bus, a boat, etc. Further, the quantity of the UEs 22, 23 is an example, and other quantities of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 10 and may communicate with each other and/or with the UEs 12, 13, 22, 23, the network 14, the server 16, the APs 18, 19, the RSU 20, and/or the BTS 21. For example, such other devices may include internet of thing (IoT) devices, medical devices, home entertainment and/or automation devices, etc.

The NTC server 26 may be included in the core network 15 or operably coupled to the core network 15 via the network 14. In an example, the NTC server 26 may be included in the AMF 9, a BTS 21 (e.g., gNB), or as part of another server in the network 15. The NTC server 26 may receive status information such as load distribution, signal strength, anticipated data rates for data flowing through the system 10. The NTC server 26 may also have data regarding the UE capabilities at each of the stations (e.g., 18, 19, 20, 21) in the system 10. The NTC server 26 may be configured to communicate with the content provider server 28, which may include web bases services such a media streaming services, gaming networks, video conference services, and other web-based media service providers.

In general, the system 10 includes packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a mobile device (e.g., UEs 12, 13, 22, 23) and the network stations (e.g., APs 18, 19, the RSU 20, and the BTS 21). The RRC protocol layer may also be used for core network support of radio bearers for the user plane data. At the physical (PHY) layer, the transport channels may be mapped to physical channels. The NTC server 26 is configured to coordinate with the network stations to determine which station should receive data. The NTC server 26 is configured to look at current data speeds, router status, and data priorities to determine whether to reroute traffic (e.g., data packets stored and/or received at the NTC server 26 and destine for the UEs) scheduled for transmission to the UEs from a serving cell (e.g., BTS 21) to another station (e.g., APs 18, 19, the RSU 20). In an example, a UE may be assigned an IP address when it connects to a network station (e.g., APs 18, 19, the RSU 20, and the BTS 21) and the NTC server 26 (or other network stations) may be configured to route traffic based on the IP addresses.

The UEs 12, 13, 22, 23 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may utilize a cellular network via the Uu interface and/or WiFi or other short-range connection via the PC5 interface). The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 21, 24 may wirelessly communicate with the UEs 12, 13, 22, 23 in the system 10 via one or more antennas. A BTS may also be referred to as a base station, an access point, a gNode B (gNB), an access node (AN), a Node B, an evolved Node B (eNB), etc. For example, the BTS 24 may be a gNB or a transmission point gNB. The BTSs 21, 24 may be configured to communicate with the UEs 12, 13, 22, 23 via multiple carriers. The BTSs 21, 24 may provide communication coverage for a respective geographic region, e.g. a cell. Each cell may be partitioned into multiple sectors as a function of the base station antennas.

The system 10 may include macro BTSs or the system 10 may have BTSs of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The UEs 12, 13, 22, 23 may be referred to as terminals, access terminals (ATs), mobile stations, mobile devices, subscriber units, etc. The UEs 12, 13, 22, 23 may include various devices as listed above and/or other devices. The UEs 12, 13, 22, 23 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of the UEs 12, 13, 22, 23 utilizing D2D communications may be within a geographic coverage area of a base station such as one or both of the BTSs 21, 24. Other UEs in such a group may be outside such geographic coverage areas, or be otherwise unable to receive transmissions from a base station. Groups of the UEs 12, 13, 22, 23 communicating via D2D communications may utilize a one-to-many (1:M) system in which each UE may transmit to other UEs in the group. A base station such as the BTS 21 and/or the BTS 24 may facilitate scheduling of resources for D2D communications. In other cases, D2D communications may be carried out between UEs without the involvement of a base station.

Figure 2:
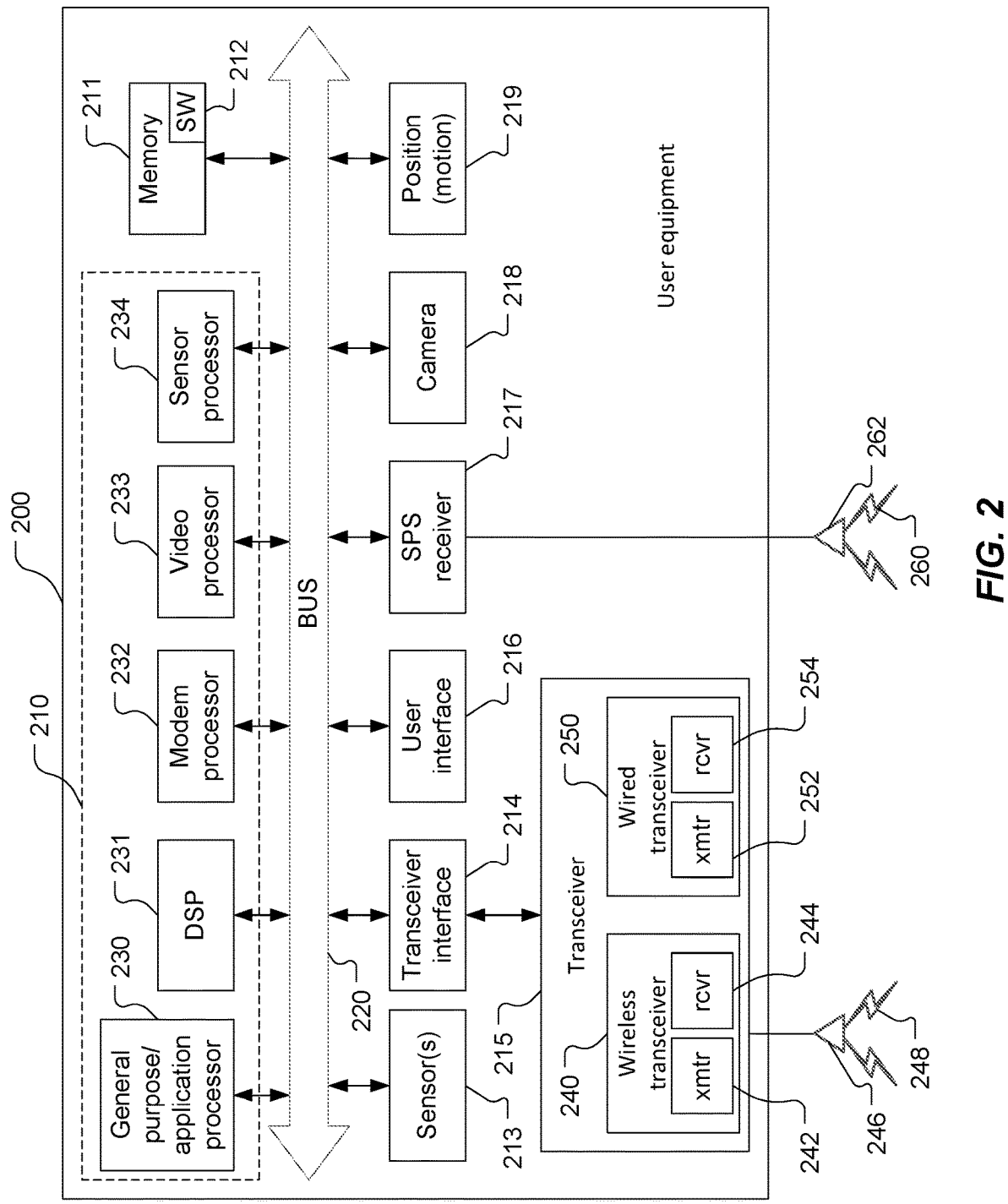
FIG. 2 is a block diagram of components of an example of a user equipment shown in FIG. 1.

Referring also to FIG. 2, a UE 200 is an example of one of the UEs 12, 13, 22, 23 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM)), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also, or alternatively, baseband processing may be performed by the processor 230 and/or the DSP 231. Other configurations, however, may be used to perform baseband processing.

The UE 200 may include the sensor(s) 213 that may include, for example, one or more inertial sensors and/or one or more environment sensors. The inertial sensor(s) may comprise, for example, one or more accelerometers (e.g., collectively responding to acceleration of the UE 200 in three dimensions), one or more gyroscopes, and/or one or more magnetometers (e.g., to support one or more compass applications). The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DPS 231 and/or the processor 230 in support of one or more applications such as, for example, applications directed to positioning and/or navigation operations.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels) and/or receiving (e.g., on one or more downlink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The antenna(s) 246 is(are) part of the UE 200 even though the antenna(s) 246 is(are) shown outside of the box of the UE 200. The wireless transceiver 240 may be configured to communicate signals (e.g., with the RSU 20 and/or one or more other RSUs, and/or one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 14 to send communications to, and receive communications from, the server 16, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also, or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The antenna 262 is part of the UE 200 even though the antenna 262 is shown outside of the box of the UE 200. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 210, the memory 211, the DSP 231 and/or one or more specialized processors (not shown) may be utilized to process acquired SPS signals, in whole or in part, and/or to calculate an estimated location of the UE 200, in conjunction with the SPS 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also, or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217 in the UE 200. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscopes, accelerometers, etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
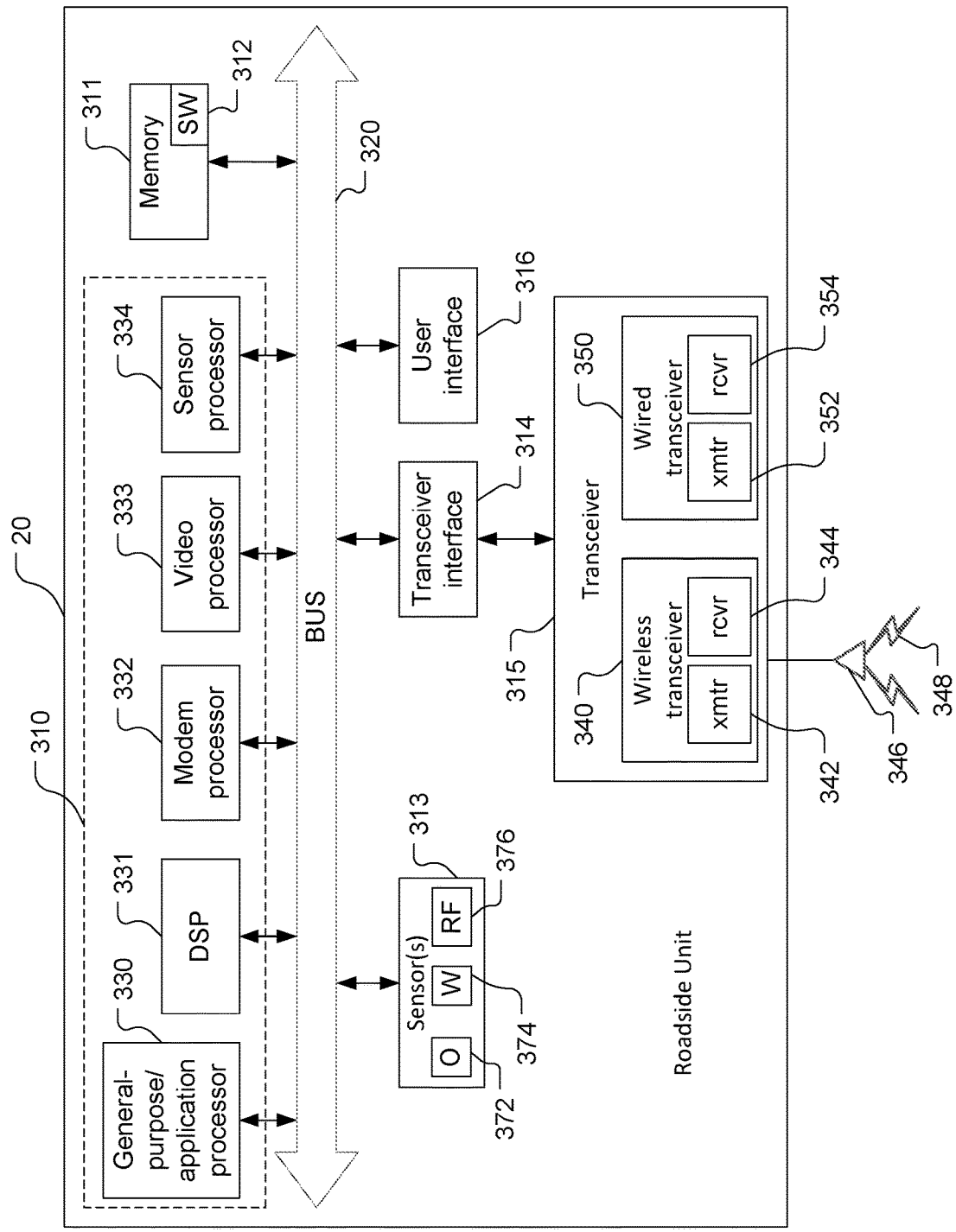
FIG. 3 is a block diagram of components of an example of roadside unit shown in FIG. 1.

Referring also to FIG. 3, an example of the RSU 20 comprises a computing platform including a processor 310, memory 311 including software (SW) 312, one or more sensors 313, a transceiver interface 314 for a transceiver 315, and a user interface 316. The processor 310, the memory 311, the sensor(s) 313, the transceiver interface 314, and the user interface 316 may be communicatively coupled to each other by a bus 320 (which may be configured, e.g., for optical and/or electrical communication). At least portions of the processor 310, the memory 311, the transceiver interface 314, and the transceiver 315 comprise the RSU base station 24. One or more of the shown apparatus (e.g., the user interface 316) may be omitted from the RSU 20. The processor 310 may include one or more intelligent hardware devices, e.g., a central processing unit (CPU), a microcontroller, an application specific integrated circuit (ASIC), etc. The processor 310 may comprise multiple processors including a general-purpose/application processor 330, a Digital Signal Processor (DSP) 331, a modem processor 332, a video processor 333, and/or a sensor processor 334. One or more of the processors 330-334 may comprise multiple devices (e.g., multiple processors). For example, the sensor processor 334 may comprise, e.g., processors for radar, ultrasound, and/or lidar, etc. The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors 330-334 performing the function. The description may refer to the RSU 20 performing a function as shorthand for one or more appropriate components of the RSU 20 performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The antenna(s) 346 is(are) part of the RSU 20 even though the antenna(s) 346 is(are) shown outside of the box of the RSU 20. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 14 to send communications to, and receive communications from, the servers 16, 26, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication. The transceiver 315 may be communicatively coupled to the transceiver interface 314, e.g., by optical and/or electrical connection. The transceiver interface 314 may be at least partially integrated with the transceiver 315.

The sensor(s) 313 may include an optical sensor 372, a weight sensor 374, an RF sensor 376, and optionally one or more other sensors not shown. While one optical sensor 372, one weight sensor 374, and one RF sensor 376 are shown in FIG. 3, and referred to herein in the singular, the optical sensor 372 may include more than one optical sensor, the weight sensor 374 may include more than one weight sensor, and/or the RF sensor 376 may include more than one RF sensor. The optical sensor 372 may be configured to capture one or more images. For example, the optical sensor 372 may include one or more cameras. The weight sensor 374 may be configured to detect the presence and/or determine the weights of objects such as the UEs 22, 23, and may be configured as one weight sensor or multiple separate weight sensors. The sensors 372, 374 are examples and not limiting of the description as numerous other types and/or quantities of sensors may be used. The RF sensor 376 may be configured to sense RF traffic associated with the geographic region.

The optical sensor 372 may include one or more cameras for capturing still or moving imagery. The camera(s) may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 330 and/or the DSP 331. Also, or alternatively, the video processor 333 may perform conditioning, encoding, compression, and/or manipulation of signals representing captured images. The video processor 333 may decode/decompress stored image data for presentation on a display device (not shown), e.g., of the user interface 316.

The user interface 316 may comprise one or more of several devices such as, for example, a speaker, microphone, display device, vibration device, keyboard, touch screen, etc. The user interface 316 may include more than one of any of these devices. The user interface 316 may be configured to enable a user to interact with one or more applications hosted by the RSU 20. For example, the user interface 316 may store indications of analog and/or digital signals in the memory 311 to be processed by DSP 331 and/or the general-purpose processor 330 in response to action from a user. Similarly, applications hosted on the RSU 20 may store indications of analog and/or digital signals in the memory 311 to present an output signal to a user. The user interface 316 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also, or alternatively, the user interface 316 may comprise one or more touch sensors responsive to touching and/or pressure, e.g., on a keyboard and/or touch screen of the user interface 316.

Figure 4:
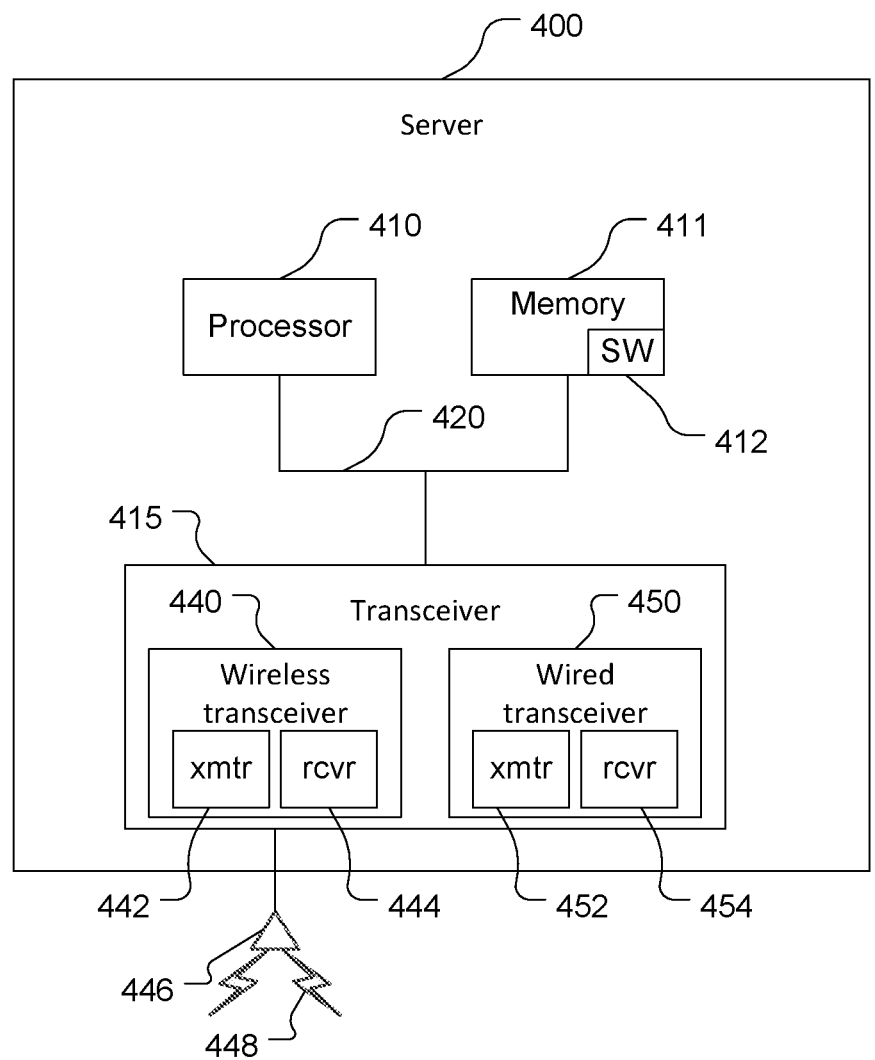
FIG. 4 is a block diagram of components of an example of an edge server.

Referring also to FIG. 4, an example of the server 400 is shown. The servers 16, 26 are examples of the server 400. The server 400 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 16. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels) and/or receiving (e.g., on one or more downlink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The antenna(s) 446 is(are) part of the server 400 even though the antenna(s) 446 is(are) shown outside of the box of the server 400. The wireless transceiver 440 may be configured to communicate signals (e.g., with the UE 200, one or more other UEs, the RSU 20, one or more other RSEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 14 to send communications to, and receive communications from, the RSU 20 and/or a web server, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

Figure 5:
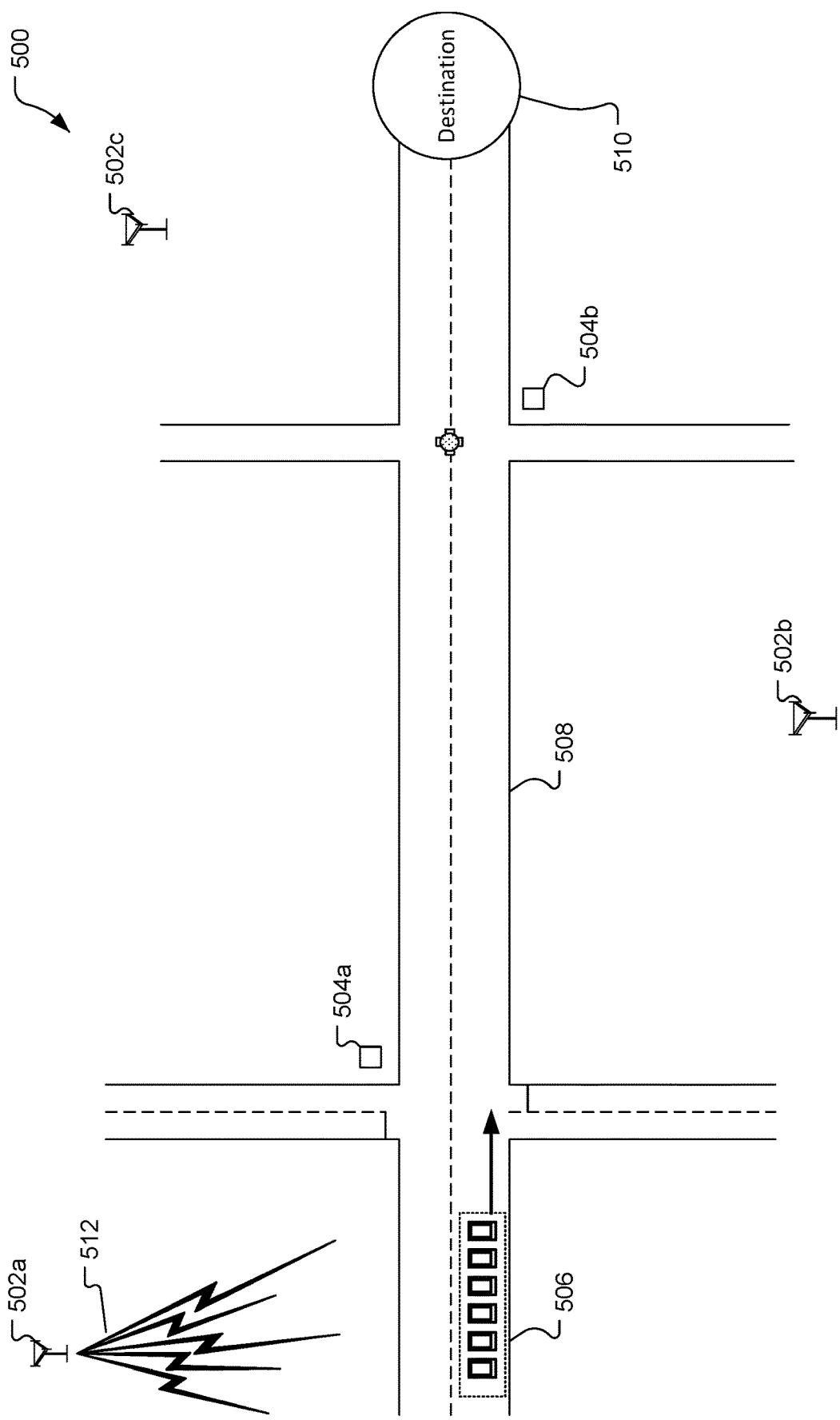
FIG. 5 is a top view of an example network with a plurality of mobile devices on a planned route at a first location.

Referring to FIG. 5, with further reference to FIGS. 1-4, a top view of an example network 500 with a plurality of mobile devices on a planned route at a first location is shown. The network 500 is an example of the communication system 10 in FIG. 1 and includes a first base station 502a, a second base station 502b, and a third base station 502c. The base stations 502a-c are examples of a BTS 21. The network 500 includes a first RSU 504a and a second RSU 504b. The RSUs 504a-b are examples of the RSU 20 in FIG. 1. The base stations 502a-c and the RSUs 504a-b are operably coupled to the core network 15, the network 14 and the NTC server 26 (not shown in FIG. 5). The RSUs 504a-b may be independent of the core network 15 and configured to communicate with the NTC server 26 via the network 14. A plurality of UEs 506 are travelling on a planned route to a destination 510. The planned route may include one or more roadways, paths, tracks, rails or other means for conveying vehicles in a terrestrial application. The locations along the planned route are within the coverage areas of one or more of the base stations 502a-c and the RSUs 504a-b. In the use case provided in FIG. 5, the planned route includes a section of roadway 508. The roadway 508 is an example and is provided to facilitate the explanation of V2X congestion-sensitive preemptive data download requests. Different sections of the roadway 508 are within the communication coverage areas of one or more of the first, second, and/or third base stations 502a-c. The roadway also includes example intersection areas equipped with the RSUs 504a-b. Other planned routes may include an unlimited variety of base stations, RSUs and/or other wireless communication devices configured to communicate with the plurality of UEs 506.

In an example, the plurality of UEs 506 may be traveling in a multi-passenger vehicle such as a bus or a train. In other examples, one or more of the plurality of UEs 506 may be, or may be users within, different vehicles travelling along the roadway 508 in a cluster such that their relative positions may be proximate to one another (e.g., within 100, 200, 500 yds) for extended periods as they progress towards the destination. For example, the UEs 506 may be in a congested traffic flow progressing toward the destination. The plurality of UEs 506 in FIG. 5 are at a first location and each of the plurality of UEs 506 is in communication with the first base station 502a via a first communication interface 512. In a V2X implementation, the first communication interface 512 may be the Uu interface configured for vehicle to cellular communications. Other network protocols and standard interfaces may also be used. Each of the plurality of UEs 506 may send a data request to the first station along with planned route information. For example, the data request may be a request for media services (e.g., streaming video, gaming network connection) or other high-data service. The planned route information may be provided directly by a user (i.e., input the destination 510, vehicle route number, etc.), or inferred from context information. For example, a UE may participate in a subscription service and historical position data may be used to determine a planned route. A multi-passenger vehicle may include a local WiFi hotspot and routes of the UE's associated with the hotspot may be based on the route of the multi-passenger vehicle. Other applications such as navigation systems, calendars (including meeting locations), and popular civic events (e.g., football games, political rallies, etc.) may provide context to determine a planned route of a UE. The LMF 16 or the NTC server 26 may be configured to determine a planned route based on the context information.

The NTC server 26 is configured to receive the data download requests and route planning information from, or associated with, each of the plurality of UEs 506. The NTC server 26 may also determine data delivery options and plan a data distribution to each of the plurality of UEs 506. For example, the NTC server 26 may include handler functions configured to route data packets based on the content type, capabilities of the respective UEs, and the service availability/network status at stations along the planned route. The service availability may be based on key performance indicators (KPIs) such as availability, latency and performance, utilization and jitter. Other KPI metrics such as throughput, TCP loss, errors and performance impacting events may be used. The NTC server 26 may associate quality of service (QoS) requirements with the type of data content associated with the data download request. Latency sensitive (i.e., delay intolerant) applications such as interactive audio and video streams and gaming networks may have higher QoS requirements as compared to media streaming application such as internet music and videos (i.e., delay tolerant applications). The NTC server 26 may determine which stations (e.g., base stations 502a-c, RSUs 504a-b) may be able to provide higher rate data downloads and/or data downloads via non-WAN interfaces (e.g., PC5 from an RSU). The NTC server 26 is configured to balance data download based on current network conditions and may favor larger downloads via the RSUs 504a-b. For example, referring to FIG. 9, a data distribution plan 900 may begin when the plurality of UEs 506 (including UE1, UE2, UE3, UE4, UE5, UE6) are communicating at the first location at a first time period 902 using the Uu interface 512 with the first base station 502. The NTC server 26 is configured to route data packets for UE1, UE2, UE3, UE4, UE5 and UE6 through the Uu interface. The data distribution plan 900 may offload some data packets to other stations (e.g., base stations 502b-c, RSUs 504a-b) for delivery at a future time when the UEs are within the respective coverage areas of the stations. The data distribution plan 900 may include providing data packets to a UE through two or more stations simultaneously. For example, one or more of the plurality of UEs may receive data packets via a Uu interface and a PC5 (or DSRC, or other interface) at the same time.

The NTC server 26 may coordinate with specific stations (e.g., base stations 502a-c, RSUs 504a-b) to determine which station should receive the data associated with a UE's request. The NTC server 26 may be configured to evaluate current network data speeds, the planned route information, and the priority of information for other UEs as compare to the requesting UE. For example, if a data download request is associated with a streaming media file (e.g., movie) and there is a dead spot (i.e., no coverage) along the planned route, the UE may be configured to request data aggregation from an upcoming RSU (PC5) and base station (Uu) to increase the number of data packets received prior to entering the dead spot. Upon exiting the dead spot, the UE may request data packets from the base station (Uu). In another example, a UE may receive an indicator from the network indicating expected congestion for the stations (e.g., base stations 502a-c, RSUs 504a-b) either along the planned route or at least along a few of the next segments of the planned route. The UE may be configured to process requests from the NTC server 26 for which data segments it wants to receive from each station and it may take into account user interaction with the UE (e.g. pause, play, fast forward, skip, etc.). In an example, a UE may be configured as a NTC server 26 such that it does not need to provide a planned route to the network. As will be described, the UE may be configured to notify future stations (e.g., base stations 502a-c, RSUs 504a-b) along its current route when it will be within the coverage area of the respective future stations.

The data distribution plan 900 may be modified based on the actual network performance and status of delivered data packets. For example, the first base station 502a may be scheduled to deliver a first set of data packets to a UE and the second base station 502b (or any other station) may be scheduled to deliver subsequent data packets to the UE. If the first base station 502a fails to provide all of the data packets in the first set, the NTC server 26 or the first station 502a may be configured to notify the second base station 502b to provide the undelivered data packets to the UE.

Figure 6:
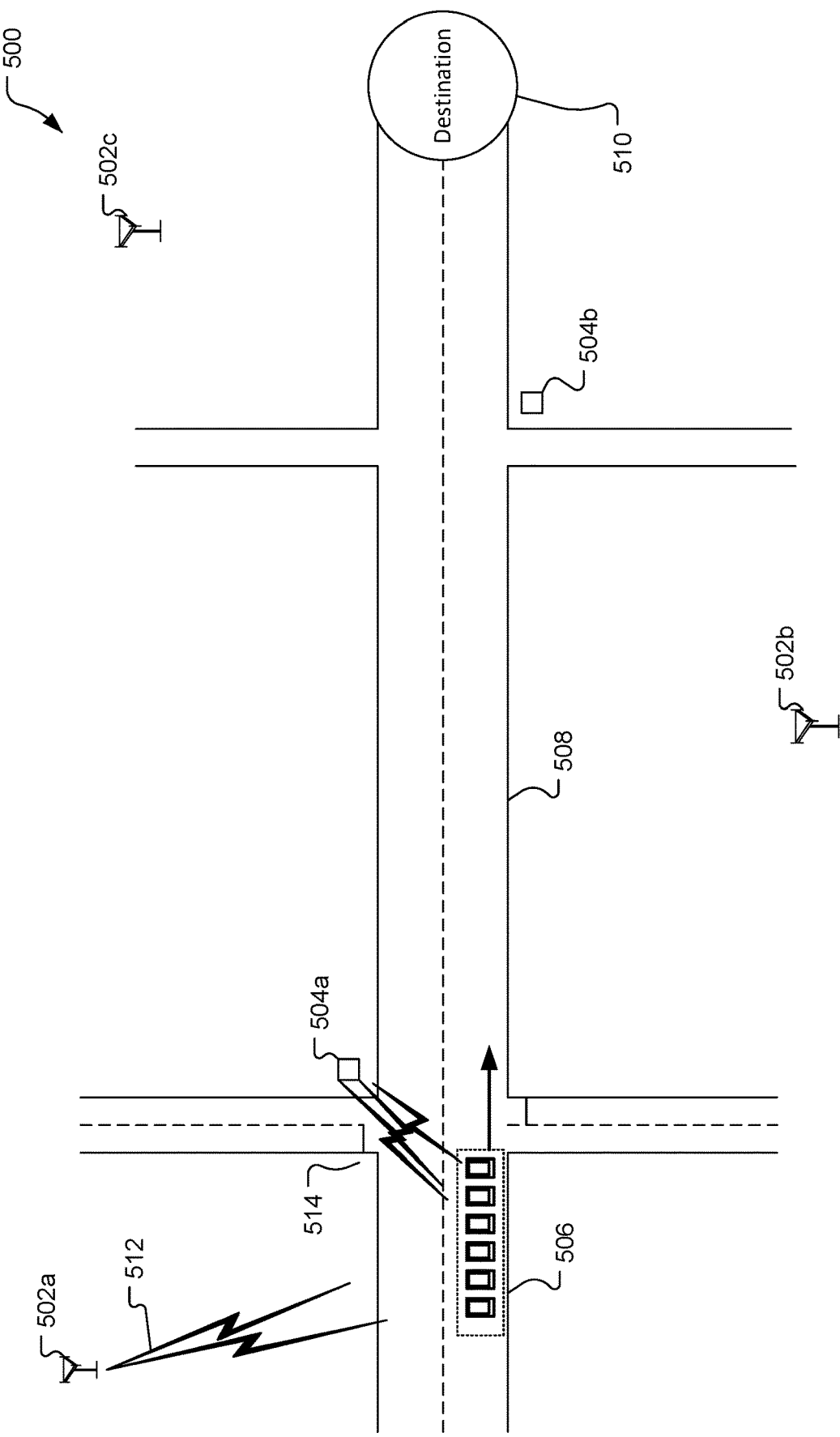
FIG. 6 is a top view of the example network with the plurality of mobile devices on the planned route of FIG. 5 at a second location.

Referring to FIG. 6, with further reference to FIGS. 1-5 and 9, a top view of the example network 500 with the plurality of mobile devices on the planned route of FIG. 5 at a second location is shown. The second location is closer to the destination 510 along the planned route and proximate to the first RSU 504a. Continuing the example, the NTC server 26 generates the data distribution plan 900 based on the estimated times the plurality of UEs 506 will be capable of communicating with other stations along the planned route. The respective parts of the data distribution plan 900 may be communicated to the appropriate UEs 506 to ensure the UEs activate the appropriate sidelink interface (e.g., PC5) when necessary. For example, at a second time period 904, a first subset of the plurality of UEs 506 including UE1, UE2 and UE4 are configured to exchange data packets with the first RSU 504a. In this example, the UE1, UE2 and UE4 may be streaming video and may receive large portions of their requested downloads via the first RSU 504a via a second interface 514 (e.g., a PC5 interface). Offloading UE1, UE2 and UE4 from the first base station 502a may increase the available bandwidth for UE3, UE5 and UE6 which remain on the Uu interface 512 with the first base station.

Figure 7:
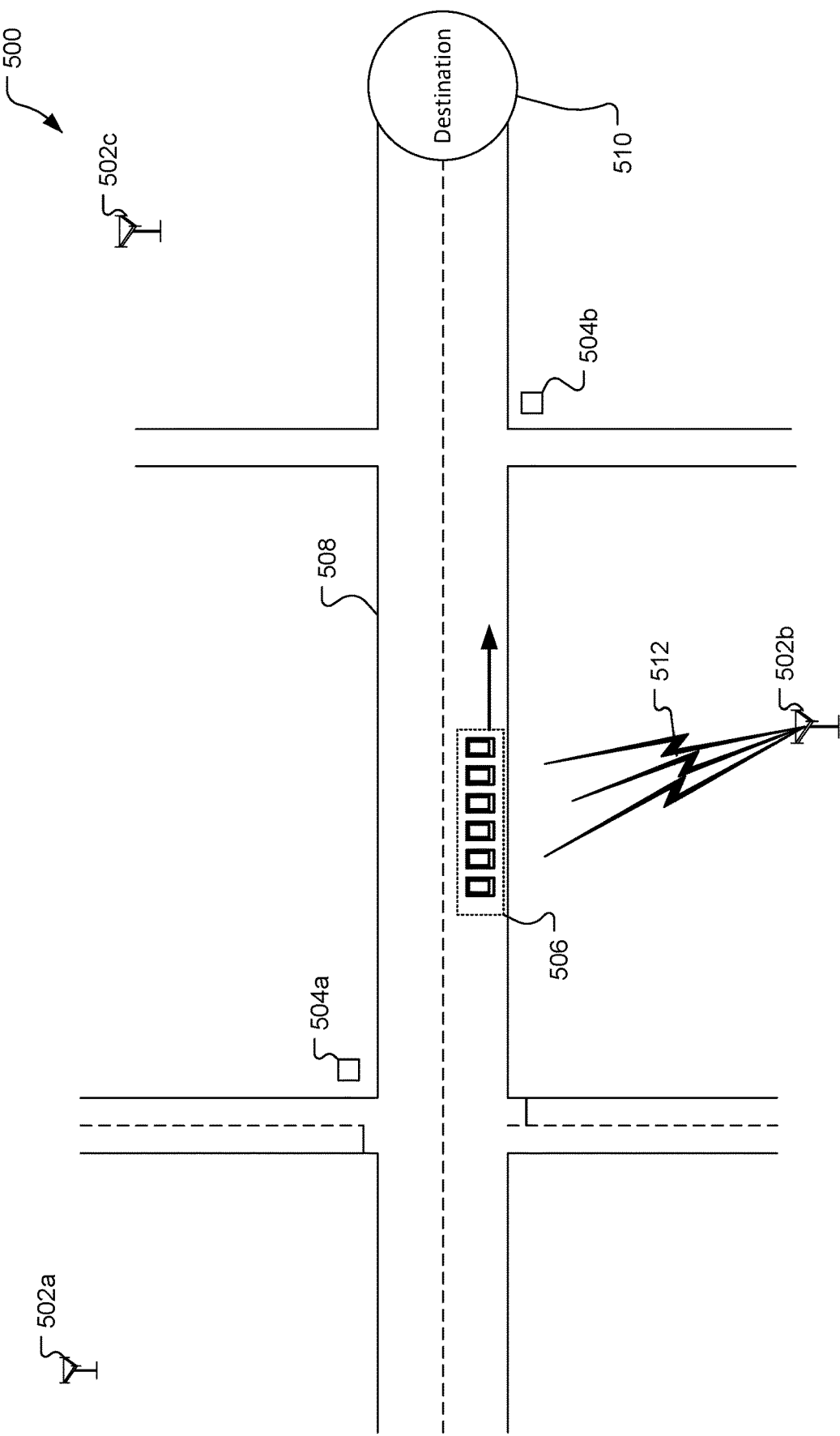
FIG. 7 is a top view of the example network with the plurality of mobile devices on the planned route of FIG. 5 at a third location.

Referring to FIG. 7, with further reference to FIGS. 1-6 and 9, a top view of the example network 500 with the plurality of mobile devices on the planned route of FIG. 5 at a third location is shown. The plurality of UEs 506 are transiting along the planned route during a third time period 906. In this example, the UE1 and UE2 received sufficient data during the exchange with the first RSU 504a at the second time period 904 and thus should not need to receive data during the third time period 906. The data packet distribution plan may include a brief period during the third time period for UE4 to communicate with the second base station 502b via the Uu interface 512. UE3, UE5 and UE6 also will communicate with the second base station 502b via the Uu interface 512.

Figure 8:
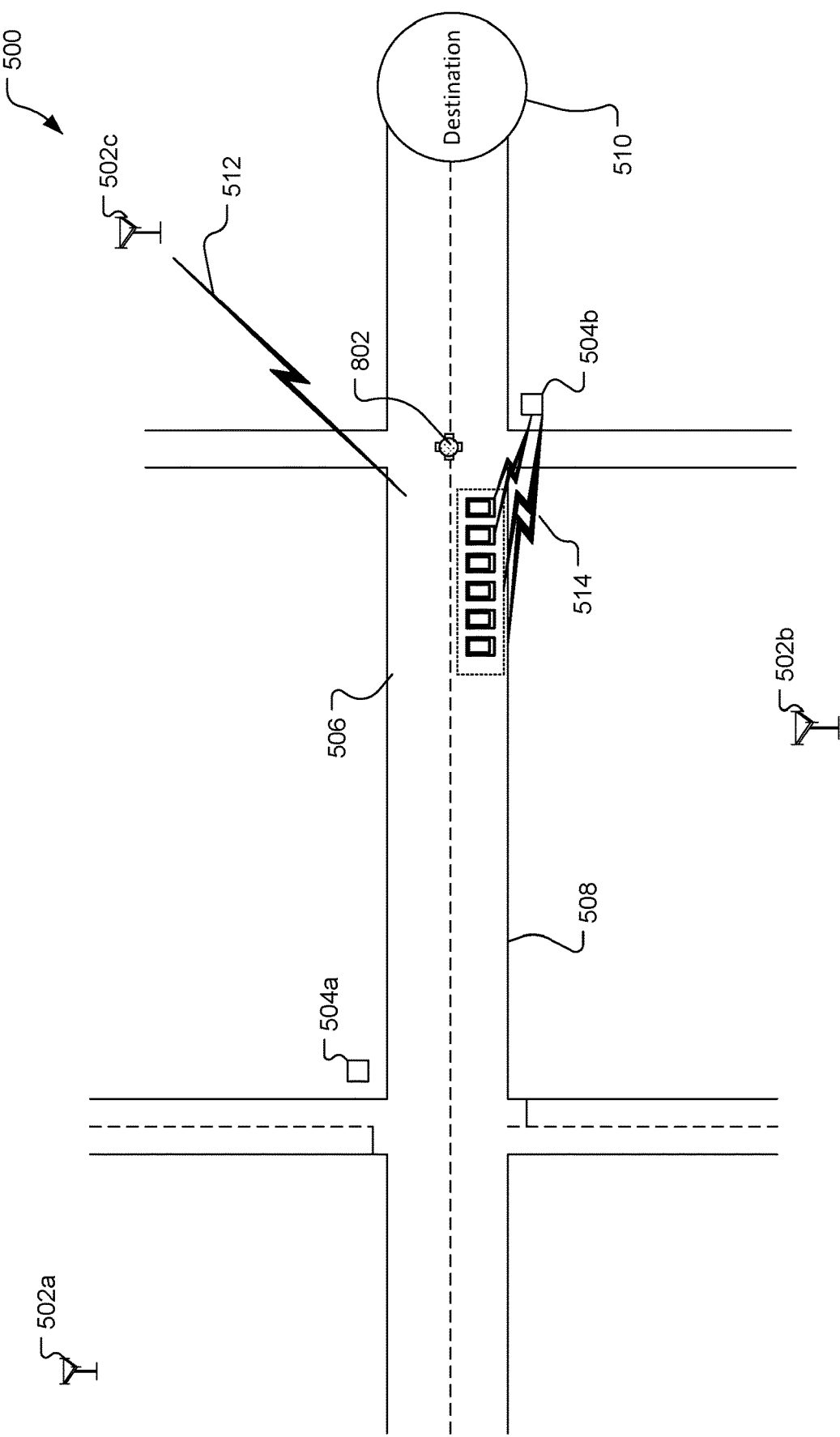
FIG. 8 is a top view of the example network with the plurality of mobile devices on the planned route of FIG. 5 at a fourth location.

Referring to FIG. 8, with further reference to FIGS. 1-7 and 9, a top view of the example network 500 with the plurality of mobile devices on the planned route of FIG. 5 at a fourth location is shown. The plurality of UEs 506 are at the fourth location during a fourth time period 908. The NTC server 26 may determine that the latency performance of the third base station 502c is low due to other data traffic, configuration, or other technical or physical reasons. As a result, additional data packets may be routed from the third base station 502c to the second RSU 504b. For example, the data packet distribution plan 900 provides data packets to UE1, UE2, UE3, UE4 and UE6 via the PC5 interface 514 from the second RSU 504b. The third base station 502c may provide data packets via the Uu link 512. In an example, UE6 may be configured to receive data packets from both the second RSU 504b and the third base station 502c simultaneously.

In an example, the second RSU 504b may be operably coupled to a traffic light 802 and configured to change the state of the traffic light 802 to modify the flow of traffic on the roadway 508. In this example, the RSU 504b may set the traffic light 802 to 'red' to hold the plurality of UEs 506 for a longer duration based on the data transfer requirements. Thus, the fourth time period 908 may be extended to allow increased amounts of data to be transferred via the PC5 interface 514 between UE1, UE2, UE3, UE4, UE6 and the second RSU 504b. As the plurality of UEs 506 continue to the destination 510, the data packet distribution plan 900 may provide data packets via the Uu interface during a fifth time period 910.

The time periods and data packet routing interfaces in data packet distribution plan 900 are examples and not limitations. For example, D2D interfaces such as DSRC may be used. Other interfaces and time periods may be used based on the network capabilities along the planned route in view of the QoS values associated with the UEs data download requests. In an example, high priority packets may utilize a ultra-reliable low-latency communication (URLLC) link. The data packet distribution plan 900 is not limited to downlink data transfers. Large files may be uploaded from one or more of the plurality of UEs 506 and the associated data packets may be included in the data packet distribution plan 900. For example, the UE may be configured to provide a data upload request to the NTC server 26 indicating the size of the file to be uploaded. The NTC server 26 may offload the data upload action from a Uu interface to a PC5 interface (i.e., to perform the upload at an RSU) to reduce the congestion on the base station via the Uu interface. The RSU may be configured to cache and transmit if latency may be large or the data upload is not urgent data.

Figure 10:
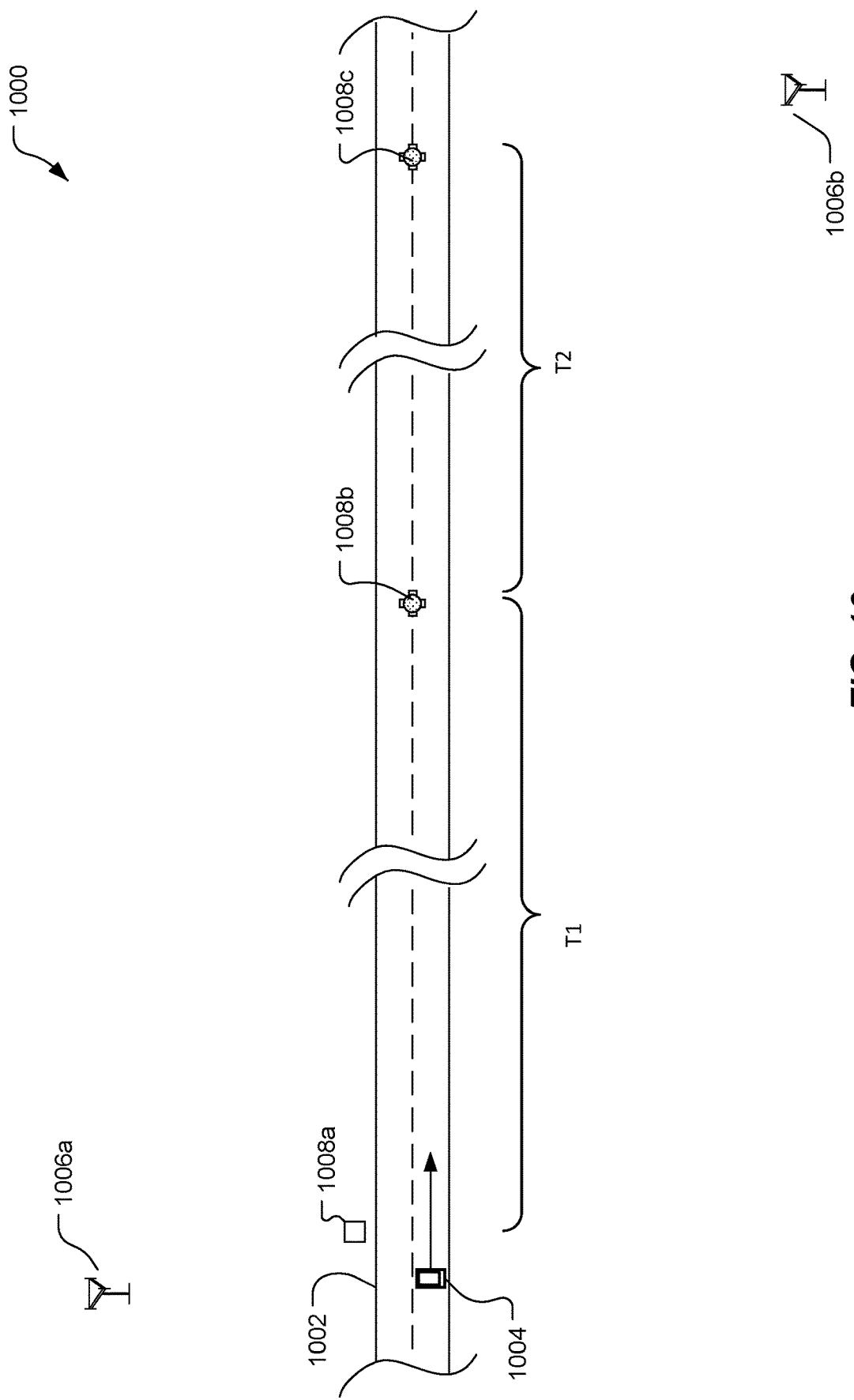
FIG. 10 is a top view of an example network including a plurality of stations and a mobile device.

Referring to FIG. 10, a top view of an example network 1000 with a plurality of stations and a mobile device is shown. The network 1000 is an example of the communication system 10 in FIG. 1 and includes a first base station 1006a, and a second base station 1006b. The base stations 1006a-b are examples of a BTS 21. The network 1000 includes a first RSU 1008a, a second RSU 1008b, and a third RSU 1008c. The RSUs 1008a-c are examples of the RSU 20 in FIG. 1. The base stations 1006a-b and the RSUs 1008a-c may be operably coupled to the core network 15, and/or the network 14. In an embodiment, the RSUs 1008a-c may be independent of the core network 15 and configured to communicate with content providers via the network 14. A UE 1004 is travelling on a roadway 1002 without a specifically planned route to a destination. The UE 1004 is an example of the UE 200. The roadway 1002 may be one or more roadways, paths, tracks, rails or other means for conveying vehicles or individuals in a terrestrial application. At least portions of the roadway 1002 are within the coverage areas of one or more of the base stations 1006a-b and the RSUs 1008a-c. The UE 1004 is configured to receive station almanac data from the base stations 1006a-b and/or the RSUs 1008a-c. The almanac data may include identification information and location information for of each of the base stations 1006a-b and/or the RSUs 1008a-c. The location information may be, for example, absolute information such as latitude, longitude and altitude, or other grid coordinates, or it may be expressed using relative information such as range and bearing to a landmark, an RSU, or another point of interest. In an example, the almanac data may be a neighbor list transmitted from one of the base stations 1006a-b and/or the RSUs 1008a-c. The UE 1004 may utilize satellite or terrestrial positioning methods to determine a current location. For example, the UE 1004 may utilize the SPS receiver 217 to determine a position based on GPS or other satellite based technologies. The UE 1004 may use the wireless transceiver 240 for terrestrial based positioning methods such as OTDOA, RTT, AoA, E-CID, etc. The UE 1004 may also utilize inertial navigation methods based on signals such as course and speed from the PMD 219 (e.g., dead reckoning estimates). The UE 1004 may also determine a position estimate based on previous fixes and map data constraints (e.g., computed speed and predicted corresponding future locations on a road in the map data).

In operation, the UE 1004 may utilize the position information in and station location information to determine an estimated time of arrival to the coverage areas associated with the base stations 1006a-b and/or the RSUs 1008a-c. The coverage areas may be defined in the almanac data or based on predefined standard ranges from the location of a transmitter (e.g., 100 m, 200 m, 500 m 1 km, 2 km, etc.). For example, referring to FIG. 10, the UE 1004 may estimate a first travel time T1 for the device to transit from a current location to the second RSU 1008b, and a second travel time T2 to transit from the second RSU 1008b to the third RSU 1008c. The transit times T1, T2 may indicate the durations of sidelink coverage gaps between the UE 1004 and one of the RSUs 1008a-c. That is, the RSUs 1008a-c may be capable of providing high bandwidth communications at a shorter range. The UE 1004 may be configured to request a data download for a delay tolerant application such as streaming media, and partition the data requests based on the estimated utilization time for the media download (e.g., watch) as compared to the coverage gaps. In this way, the UE 1004 may reduce the data traffic via the Uu interface with the base stations 1006a-b by preemptively requesting portions of the media from the RSUs 1008a-c via the PC5 interface when the RSUs 1008a-c are in communication range.

Figure 11:
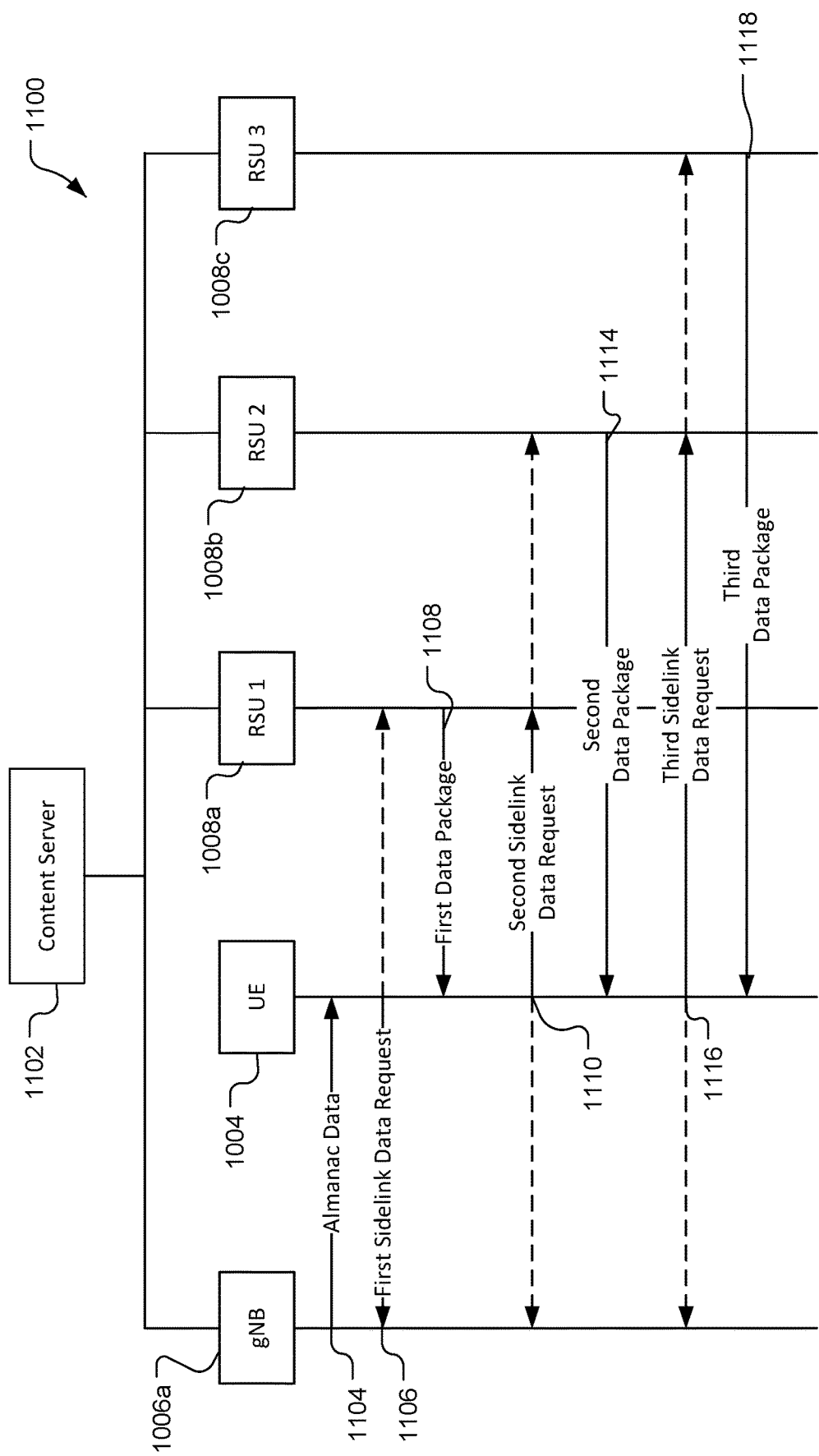
FIG. 11 is an example message flow including download requests and data transfers between the stations and the mobile device of FIG. 10.

Referring to FIG. 11, with further reference to FIGS. 1-10, an example message flow 1100 including download requests and data transfers between the base stations 1006a-b and/or the RSUs 1008a-c and the UE 1004 is shown. The base stations 1006a-b and/or the RSUs 1008a-c may be connected to a content server 1102 via a backhaul or other network connection. In an example, the base stations 1006a-b and/or the RSUs 1008a-c may be independent stations outside of the communication system 10 and configured to communicate with the content server 1102 via the Internet. One of the base stations 1006a-b and/or the RSUs 1008a-c may provide the UE 1004 with one or more messages including almanac data 1104. The almanac data may be based on network services (e.g., the LMF 16) or other third party crowdsourced databases. In an networked example, the UE 1004 may provide a first sidelink data request 1106 to the first station 1006a via a Uu interface. In a non-networked example, the UE 1004 may be configured to provide the first sidelink data request 1106 to a nearby RSU, such as the first RSU 1008a.

The first sidelink data request 1106 may be a request for a portion of a media file from a content server 1102. As an example, and not a limitation, the media file may represent a movie file (e.g., moving pictures expert group 4 (.mp4), Apple QuickTime Movie (.mov), Windows Media Video (.wmv), Windows Media (.asf), etc.) of approximately 4 GB is size and an expected runtime of approximately 2 hours. The first sidelink data request 1106 may be used for other file types, size and runtimes. The UE 1004 is configured to determine the first transit time T1 based on the distance between a current location (or the first RSU 1008a) and the second RSU 1008b. In an example, assuming the first transit time T1 means a gap duration of 40 minutes, the first sidelink data request 1106 includes a request for a download of data equal to approximately 40 minutes of viewing time. For example, the UE 1004 may perform a linear calculation such as:

Download request size=(Gap duration/Total Runtime)*Total File size    (1)

Continuing the example, the first sidelink data request 1106 may include header and service indicators to enable the content server 1102 to provide the first 40 minutes of the media file (e.g., 1.3 GB based on equation (1)). The requested time may be larger than the gap duration by a fixed amount (e.g., 10%, 20%, etc.) to minimize delays in viewing due to delays in the transit time. In an example, the first sidelink data request 1106 may indicate a service request (e.g., location of the media file) and the gap duration, and the RSU is configure to obtain the data files based on the first sidelink data request 1106. In an example, the first sidelink data request 1106 may include an indication of the RSU (e.g., RSU station ID) to provide the data files.

The first RSU 1008a is configured to provide the first data package 1108 in response to the first sidelink data request 1106. For example, the first data package may include the first 40-50 minutes of the requested media file. Upon receipt of the first data package 1108, the UE 1004 may be configured to transmit a second sidelink data request 1110 based on an expected transit time and corresponding coverage gap between the second RSU 1008b and the third RSU 1008c. In a networked embodiment, the second sidelink data request 1110, and subsequent data requests, may be provided to a serving cell such as the first base station 1006a. That is, the UE 1004 may be configured to provide data requests via the Uu interface and receive bulk data transfers via the PC5 interface. In an embodiment, the data requests may utilize the PC5 interface with a RSU. For example, the second sidelink data request 1110 may be transmitted to the first RSU 1008a, and the first RSU 1008a may be configured to forward the second sidelink data request 1110 to the second RSU 1008b. In an example, the UE 1004 may be configured to transmit the second sidelink data request 1110 to the second RSU 1008b directly (i.e., when the UE 1004 is within communication range of the second RSU 1008b). The second sidelink data request 1110 may indicate a requested file size based on the second transit time T2 (i.e., the gap duration between the second RSU 1008b and the third RSU 1008c). While in communication range of the second RSU 1008b, the UE 1004 receives the second data package 1114 including the portion of the media file indicated in the second sidelink data request 1110. The UE 1004 may generate a third sidelink data request 1116 based on gap duration between the third RSU 1008c and the next RSU the UE 1004 will encounter. The UE 1004 may send the third sidelink data request 1116 to the first station 1006a, the second RSU 1008b, or the third RSU 1008c. The UE 1004 receives a third data package 1118 from the third RSU 1008c based on the third sidelink data request 1116.

The message flow 1100 may continue on a station-to-station basis without knowledge of the UE's 1004 intended route. The data requests and corresponding data packages are based on the gap duration between two stations, and the UE 1004 is configured to determine the size of the data package based on the gap duration and the application runtime associated with the media file. The distance and gap durations between the RSUs 1008a-c are examples and not limitations. In an urban use case, the RSUs may be within 2, 5, 10 minutes of one another. The UE 1004 may be configured to use third party navigation and/or route planning services (e.g., Waze, Amazon Traffic Advisor, etc.) to determine the estimated transit time between two RSUs. While the message flow 1100 depicts a download use case, the UE 1004 may be configured to partition large upload files based on the coverage transmit times. That is, the UE 1004 may determine an expected time available to send data to each of the RSUs 1008a-c and then transmit portions of the data during those transit times.

Figure 12:
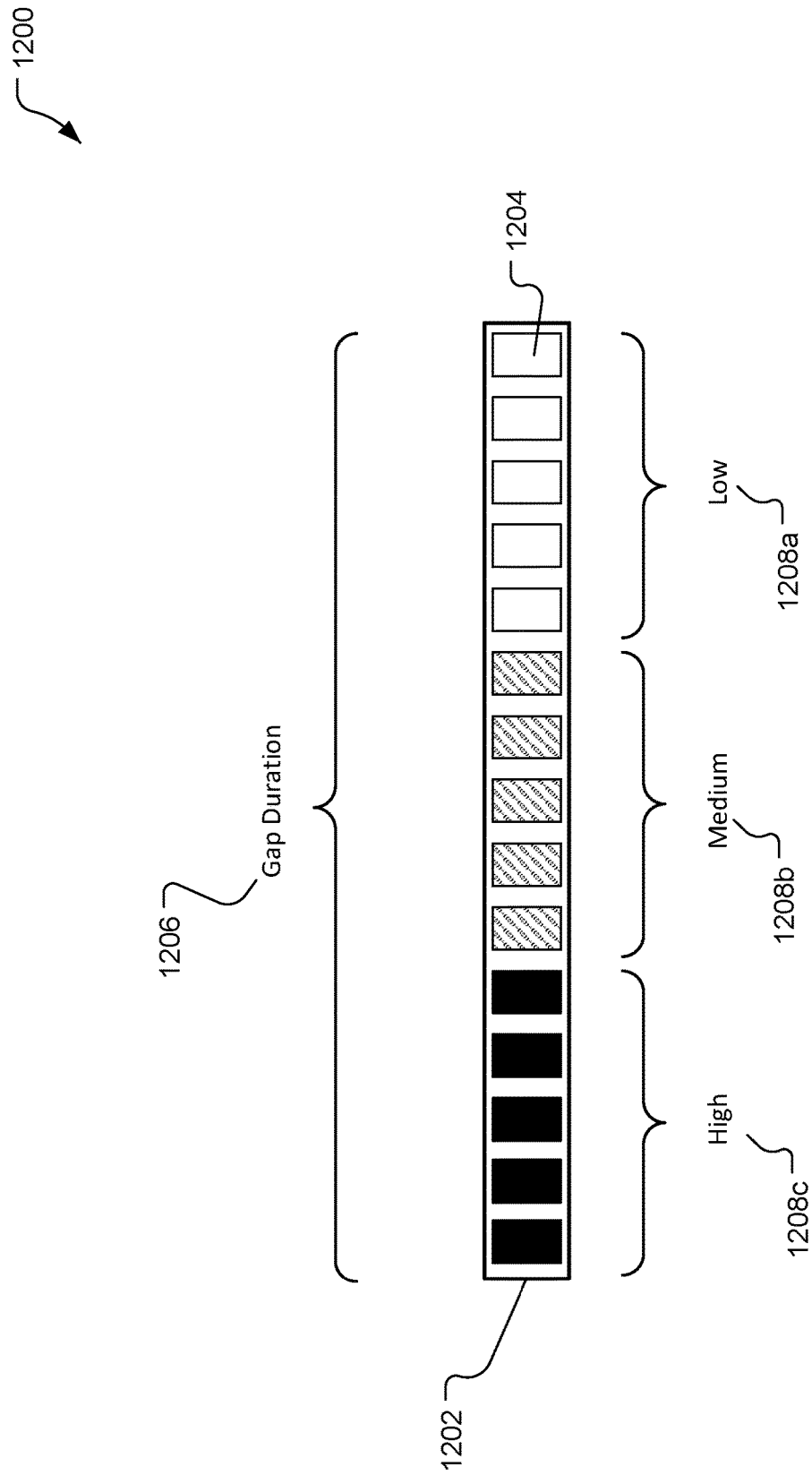
FIG. 12 is an example indicator for prioritizing data download requests.

Referring to FIG. 12, and example indicator 1200 for prioritizing data download requests is shown. The indicator 1200 may be an object displayed in a graphical user interface such as a progress bar to notify the user of the rate of file consumption as compared to the gap duration. For example, a download request may be based on an assumption that a user will be viewing a media file for the entire gap duration. In reality, the user may pause or otherwise stop consuming a media file during the transit through the gap duration. The indicator 1200 may correspond to priority variables the UE 1004 may incorporate into a sidelink data request. For example, the indicator 1200 may include a progress bar 1202 with a plurality of capacity markers 1204 indicating a relative memory size portion of a media data file. Each capacity marker 1204 may indicate 5, 10 20, 100 MB etc. of memory of unconsumed (e.g., not yet played) media content. In total, the capacity markers 1204 represent a gap duration 1206. As a user consumes the media file, the capacity markers 1204 may be configured to change a visible property to represent the user's progress through the stored media. That is, the capacity markers 1204 provide an indication of that amount of time remaining in the locally stored media file. As the media is consumed, a priority for obtaining additional media files may increase. For example, a low priority 1208a may be assigned when a majority of the media file is unconsumed, a medium priority 1208b may be assigned when approximately half of the media file is unconsumed, and a high priority 1208c may be assigned when a majority of the media file is consumed. The priorities may be implemented, for example, in use cases where the availability of RSUs is such that the gap durations between RSUs may be small and a data transfer rates are significantly higher than the data consumption rate. In such a use case, the UE 1004 may be configured to obtain new media files from RSU's when the current media file is in medium or high priority range. The UE 1004 may be configured to request media from a base station via a Uu connection if the stored media file is almost completely consumed (e.g., less than 10% remaining). Other messaging configurations may be associated with a level of unconsumed media remaining. In an example, the indicator 1200 may be displayed to the user as an icon in the corner of a display screen while the media is being consumed, or in response to a screen touch action while the media is playing. The user may be able to configure the transmission of sidelink data requests based on the amount of unconsumed media and the indicator 1200 may display when the requests are being transmitted and/or when data is being received. For example, the capacity markers 1204 may turn yellow to indicate that the UE 1004 is preparing or sending a sidelink data request via a PC5 interface, and red when the UE 1004 is sending a data request via a Uu interface. The capacity markers 1204 may turn green when data is being downloaded. Other colors and configuration options may be used to show the status of data transfer requests and data downloads.

Figure 13:
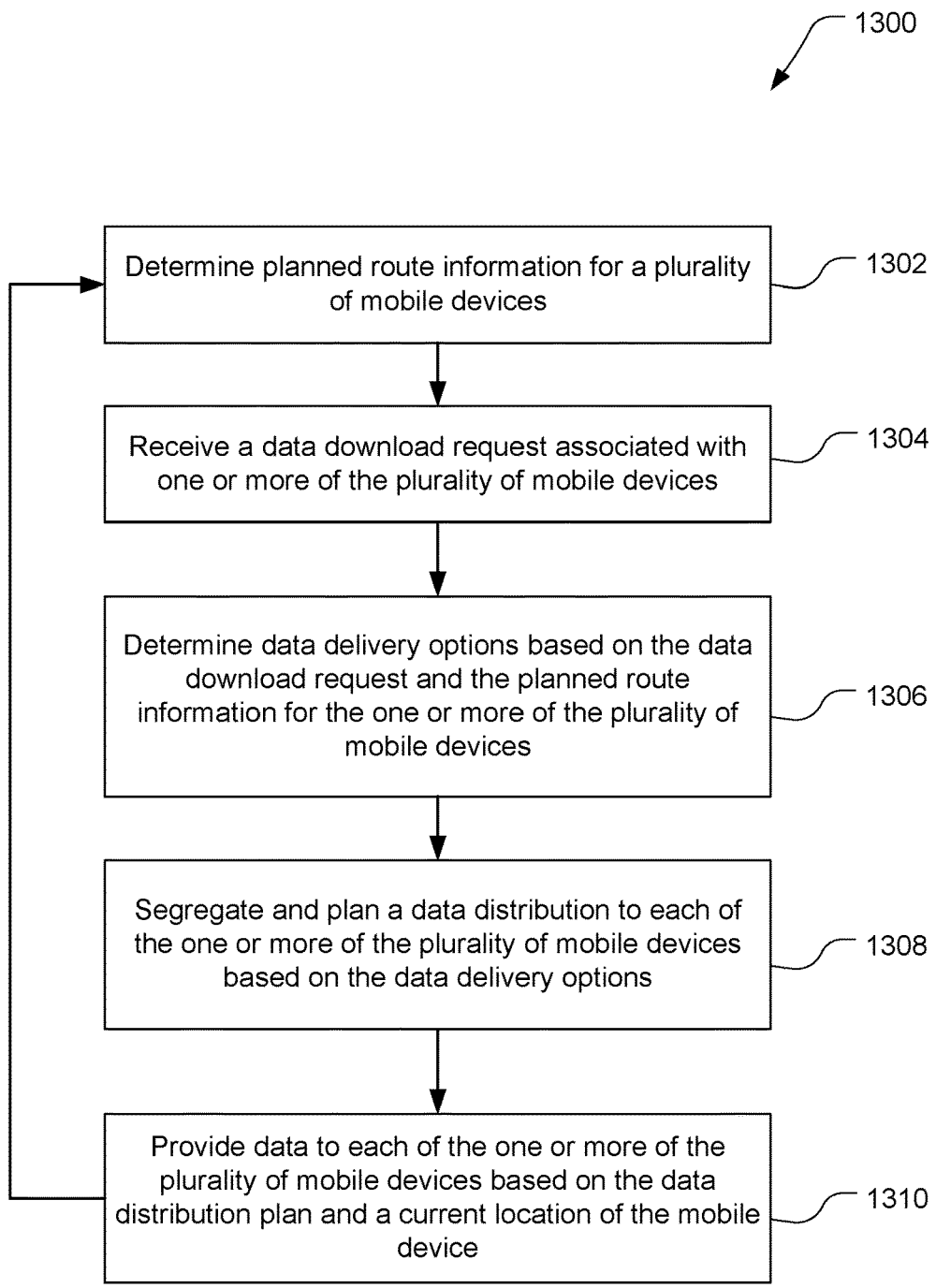
FIG. 13 is a block flow diagram of an example method for providing data to a mobile device based on a distribution plan.

Referring to FIG. 13, with further reference to FIGS. 1-11, a method 1300 for providing data to a mobile device based on a distribution plan includes the stages shown. The method 1300 is, however, an example and not limiting. The method 1300 may be altered, e.g., by having stages added, removed, rearranged, combined, performed concurrently, and/or having single stages split into multiple stages. For example, stages 1302 and 1304 for determining planned route information and receiving a data download request may be completed simultaneously. Still other alterations to the method 1300 as shown and described are possible.

At stage 1302, the method includes determining planned route information for a plurality of mobile devices. The NTC server 26 is a means for determining the planned route information. In an example, one or more of the plurality of UEs 506 may provide route information to the NTC server 26 via the core network 15 and/or the network 14. The route information may be based on SPS position data (e.g., via the SPS receiver 217 and the PMD 219) in combination with map data to infer a likely trajectory of the UEs 506. The users of the UEs 506 may provide input to identify a destination 510 and the NTC server 26 may be configured to utilize one or more routing algorithms to determine the planned route information based on the UEs 506 current location and the destination 510. In an example, a UE may be associated with a multi-passenger vehicle with an established route. A user may enter a bus number, train number, or other information to identify the vehicle and route they will be transported on. In an example the vehicle identification may be associated with the vehicle's hotspot MAC address information. The NTC server 26 may utilize the current location, course and speed of a UE to create a dynamic cluster of vehicles or UEs moving along a planned route. The planned route may be inferred based on previously stored route information using similar location, direction, speed and time variables. For example, vehicles entering a long stretch of highway, a High Occupancy Vehicle (HOV) lane, or Express lane may have similar routes based on the limited opportunities to exit from the highway. The UEs active in a crowded section of highway (e.g., traffic jam) may be grouped into dynamic clusters of UEs including approximately 10-40 UEs for determining a data packet distribution plan. The plurality of mobile devices may include combinations of mobile devices in multi-passenger vehicles and dynamic clusters. Other set sizes may be used based on the capabilities of the network and the speed of the set along the planned route.

At stage 1304, the method includes receiving a data download request associated with one or more of the plurality of mobile devices. The NTC server 26 is a means for receiving the data download request. Each of the UEs in the plurality of UEs 506 may access the network 500 via one or more wireless interfaces such as the Uu interface 512 and the PC5 interface 514. The NTC server 26 may receive a request associated with a mobile device from another server (e.g., a routing server) on the network 500. The user(s) of the one or more UEs 506 may request data from the network 500 associated with streaming or other high data flow applications from a web based data source such as the content provider server 28. For example, users may utilize a UE for watching and listening to media such as television, movies and music media files. Applications such as video conferencing and gaming may also utilize significant bandwidth. The near simultaneous requests of the plurality of UEs 506 may create network congestion and the resulting network limitations may degrade the performance of the user's applications. Video resolution and/or frame rates may be decreased, latency may increase, or applications may stall while waiting for data to buffer. The NTC server 26 may be configured to receive the data download requests from the plurality of UEs 506 and store at least a portion of the requested data locally (e.g., in the memory 411) for scheduled transmission to the UEs.

At stage 1306, the method includes determining data delivery options based on the data download request and the planned route information for the one or more of the plurality of mobile devices. The NTC server 26 is a means for determining the data delivery options. The NTC server 26 is configured to monitor the status of the network 500 to determine the current data transfer capabilities of the stations in the network (e.g., base stations 502a-c, RSUs 504a-b). In various embodiments, stations may be base stations 502a-c (e.g., referred to as BTS, BS, gNodeB, TRP, etc.), RSUs 504a-b, and/or Access points or other transceivers. The data delivery options may be based on the KPIs of the network 500. The NTC server 26 may utilize the current network status information to determine the available stations along the planned route determined at stage 1302. Each of the stations in a network may be included in an almanac (e.g., database) indicating its location and communications capabilities (e.g., frequencies, timing, interfaces, etc.). In an example, the almanac may include an indication of the coverage area for the stations. The almanac may persist on the NTC server 26 or be accessible via the network 14 and/or the core network 15. The data delivery options based on the network 500 include, for example, utilizing the Uu interface with the base stations 502a-c and the PC5 sidelink interface with the RSUs 504a-b. Thus, the NTC server 26 may utilize the base stations 502a-c and the RSUs 504a-b to segregate and plan a data distribution. The data delivery options are not limited to radio technologies. In an example, light-based systems such as Li-Fi and Visible Light Communication (VLC) may be used to transfer data.

Figure 9:
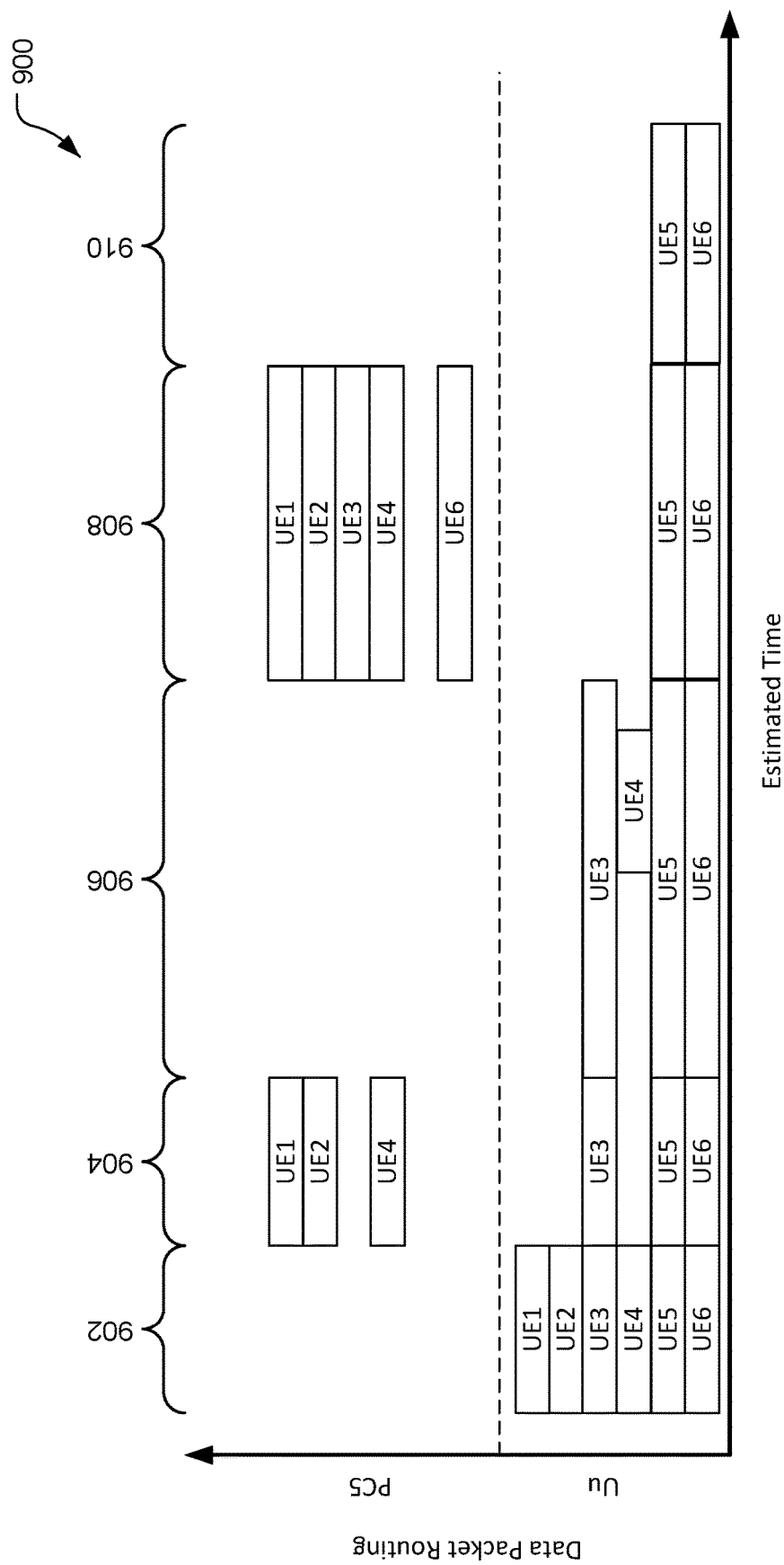
FIG. 9 is a conceptional diagram of an example data packet distribution plan.

At stage 1308, the method includes segregating and planning a data distribution to each of the one or more of the plurality of mobile devices based on the data delivery options. The NTC server 26 is a means for segregating and planning the data distribution. The data download requests from the UEs 506 may be initially classified based on the QoS requested or otherwise associated with the applications executing on the individual UEs. High QoS applications, such as video conferencing and gaming, may be intolerant to transmission delays. Lower QoS applications, such as media streaming and other large file downloads, may tolerate transmission delays without impacting the user experience. The QoS values may be mapped to network KPI metrics to determine if the available data delivery options are satisfactory. The NTC server 26 is configured to segregate the data delivery based on the QoS values and determine which data packets may be delayed while minimizing the impact to the user's experience. Referring to FIG. 9, the NTC server 26 may segregate the data packets to be transmitted to the plurality of UEs 506 based on the available interfaces and estimated times that the UE's will be proximate to a station (e.g., 502a-c, 504a-b). As previously described, the NTC server 26 may preemptively allocate data packets for the respective UEs based on the estimated time periods 902, 904, 906, 908, 910. In an example, the data distribution plan includes caching the data packets at a station 502*a-c*, 504*a-b* prior to the UEs arrival. For example, the NTC server 26 may be configured to provide the data packets for UE1, UE2 and UE4 for the second time period 904 to the first RSU 504*a* to be saved in memory 311 until the data packets can be transmitted to the respective UEs when they are in communications range.

At stage 1310, the method includes providing data to each of the one or more of the plurality of mobile devices based on the data distribution plan and a current location of the mobile device. The NTC server 26 and the stations 502*a-c*, 504*a-b* are a means for providing the data to the mobile devices. The NTC server 26 is configured to provide data packets for the plurality of UEs 506 to the appropriate stations 502*a-c*, 504*a-b* such that they can be transmitted at the corresponding time periods. In an example, the data packets may be cached in the local memories of the respective stations 502*a-c*, 504*a-b* prior to the estimate time periods in which the data packets will be delivered to the UEs. The data packets are provided when the current location of the plurality of UEs 506 is proximate (e.g., within communication range) of a station 502*a-c*, 504*a-b*. For example, the second time period 904 is associated with the first RSU 504*a* and the data packets for UE1, UE2, and UE4 are transmitted via the PC5 interface while the UEs are within communication range of the first RSU 504*a*. Similarly, the third time period 906 is associated with the second base station 502*b* and the data packets for UE3, UE4, UE5 and UE6 may be transmitted via the Uu interface while the UEs are within communication range of the second base station 502*b*. In an example, the data packets may be transmitted within a portion of a time period. In a cellular network, some areas of a cell may have higher data transfer capabilities due to geographic obstructions and other system factors such as multi-path signal interference. The NTC server 26 may utilize the known performance characteristics (e.g., bandwidth heatmap) of a cell to generate or modify the data distribution plan and provide the data packets to the UEs.

Figure 14:
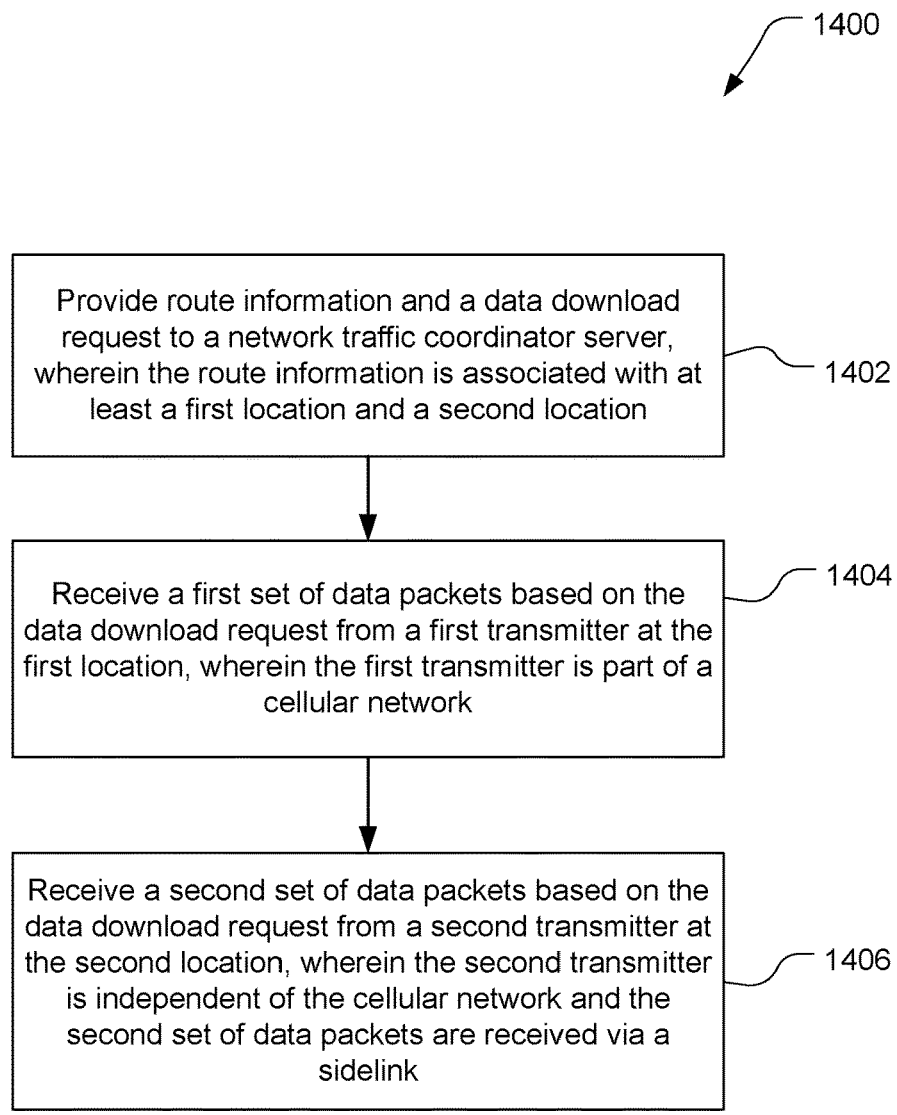
FIG. 14 is a block flow diagram of an example method for receiving data packets with a mobile device.

Referring to FIG. 14, with further reference to FIGS. 1-11, a method 1400 for receiving data packets with a mobile device includes the stages shown. The method 1400 is, however, an example and not limiting. The method 1400 may be altered, e.g., by having stages added, removed, rearranged, combined, performed concurrently, and/or having single stages split into multiple stages. For example, stages 1404 and 1406 for receiving data packets from cellular and independent (i.e., non-cellular) networks may be rearranged or may occur simultaneously. Still other alterations to the method 1400 as shown and described are possible.

At stage 1402, the method includes providing route information and a data download request to a network traffic coordinator server, wherein the route information is associated with at least a first location and a second location. The UE 200 including the transceiver 215 is a means for providing the route information and the data download request. The UE 200 is an example of one of the plurality of UEs 506 in FIGS. 5-9 (e.g., UE1, UE2, UE3, UE4, UE5, UE6). The UE 200 may include a navigation and/or route planning application (e.g., Waze, Google Maps, etc.) configured to generate a route based on the UE's 200 current location and a desired destination input by the user. The first location and the second location are along the route. The UE may provide the route information generated by the navigation application to the NTC server 26 via the core network 15 and the network 14 at the time the user makes a data download request. The data download request may be the initiation of a streaming application (e.g., Netflix, Spotify, etc.), the execution of a gaming application, or a video conferencing system. In general, the data download request may be inherent in local applications which may utilize data from a networked server. The NTC server 26 may be configured to request the route information from the UE 200 in response to detecting the data download request. The NTC server 26 may forward the data download request to an external system (e.g., media content providers) and receive the requested data. The NTC server 26 is configured to store the received data packets (including data and/or control signals) and generate a data distribution plan 900 such as described in FIG. 9. The data packets may be provided to the stations 502*a-c*, 504*a-b* based on the route information and the estimated time periods when the UE 200 will be within range of the stations.

At stage 1404, the method includes receiving a first set of data packets based on the data download request from a first transmitter at the first location, wherein the first transmitter is part of a cellular network. The UE 200 including the transceiver 215 is a means for receiving the first set of data packets. The data distribution plan 900 may schedule one or more data packets to be transmitted via a cellular base station, such as the first station 502*a*. For example, the UE 200 may be configured to communicate with the first base station 502*a* via the Uu link 512 when the UE 200 is in the first location. In general, the first location may be anywhere within the communication range of the first station 502*a*.

At stage 1406, the method includes receiving a second set of data packets based on the data download request from a second transmitter at the second location, wherein the second transmitter is independent of the cellular network and the second set of data packets are received via a sidelink. The UE 200 including the transceiver 215 is a means for receiving the second set of data packets. The data distribution plan 900 may schedule one or more data packets to be transmitted via an independent transmitter such as the RSU 504*a*. The communication between the RSU 504*a* and the UE 200 may occur via a D2D link (e.g., direct link, PC5, DSRC, etc.), which is independent of cellular base stations 502*a-c*. In V2X applications, the PC5 interface 514 is used for communication between the UE 200 and the RSU 504*a*. The NTC server 26 may provide instructions to the UE 200 to access the first RSU 504*a* at a particular time (e.g., the second time period 904) to obtain data packets associated with the data download requested provided at stage 1402. For example, referring to FIGS. 6 and 9, UE1 is configured to receive data packets from the first RSU 504*a* when the plurality of UEs arrive at the second location. While the first base station 502*a* and the first RSU 504*a* are used in this example, the method is not so limited. Other combinations of cellular base stations and independent stations (e.g., RSUs, VLC, APs) may be used. The independent stations typically have higher data transfer rates than the cellular base stations and higher overall loading capacity (i.e., a greater available capacity).

Figure 15:
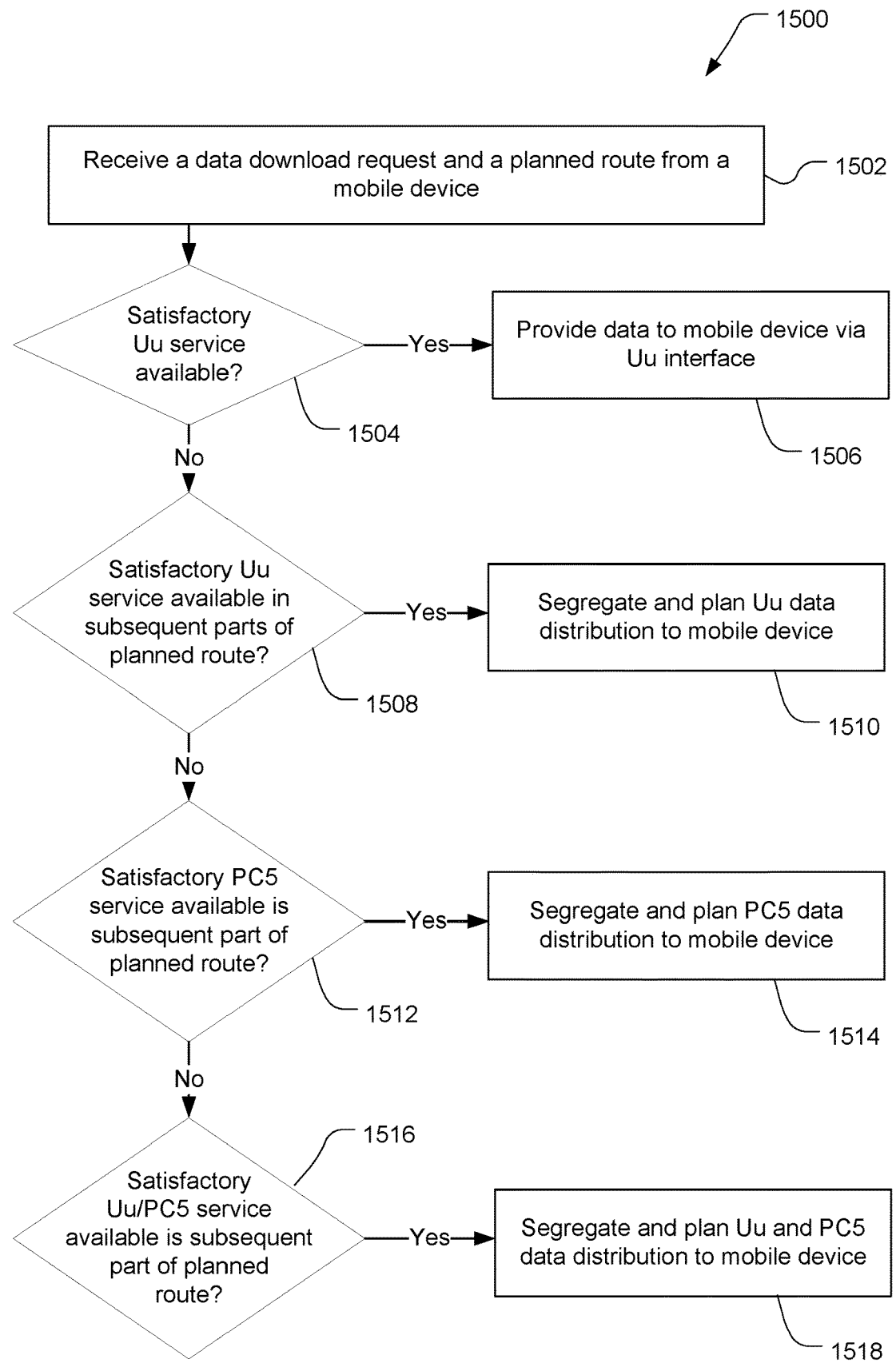
FIG. 15 is a block flow diagram of an example method for generating a data distribution plan.

Referring to FIG. 15, with further reference to FIGS. 1-11, a method 1500 for generating a data distribution plan includes the stages shown. The method 1500 is, however, an example and not limiting. The method 1500 may be altered, e.g., by having stages added, removed, rearranged, combined, performed concurrently, and/or having single stages split into multiple stages. Still other alterations to the method 1500 as shown and described are possible.

At stage 1502, the method includes receiving a data download request and a planned route from a mobile device. The NTC server 26 is a means for receiving the data download request and planned route. One or more of the plurality of UEs 506 may provide route information to the NTC server 26 via the core network 15 and/or the network 14. In an example, a UE may be associated with a multi-passenger vehicle with an established route. A user may enter a bus number, train number, or other information to identify the vehicle and route they are being conveyed on. Other location services such as navigation applications may be used to determine a route of a mobile device. The user(s) of the one or more UEs 506 may request data from the network 500 associated with streaming or other high data flow applications. For example, users may utilize a UE for watching and listening to a media file such as television, movies and music files. The data download request may be the initiation of an associated streaming application (e.g., Netflix, Spotify, etc.), a gaming application, or a video conferencing system. The NTC server 26 is configured to receive planned route information associated with the mobile devices making the data download request.

At stage 1504, the method includes determining if satisfactory Uu services are available for the data download request. The NTC server 26 is a means for determining if there is satisfactory Uu service available. The NTC server 26 may include, or have access to (e.g., via an API), handler functions configured to route data packets based on the content type, capabilities of the respective UEs, and the service availability/network status at stations along the planned route. The service availability may be based on KPIs such as availability, latency and performance, utilization and jitter. Other KPI metrics such as throughput, TCP loss, errors and performance impacting events may be used. The NTC server 26 may utilize the network status information to determine if the base stations 502*a-c* have sufficient capacity to meet the QoS requirements for the data content associated with the data download request. If so, the NTC server 26 may utilize the communication network 500 to provide data packets to the mobile devices via the Uu interface 512 at stage 1506.

At stage 1508, if the available Uu service is not satisfactory, the method includes determining if satisfactory Uu services are available in subsequent parts of the planned route. The NTC server 26 is a means for determining if there are satisfactory Uu services available in subsequent parts of the planned route. The NTC server 26 may utilize the handler functions previously described to determine the service availability/network status at stations along the planned route. The data packets may be classified as delay tolerant or delay intolerant. The data packets associated with delay tolerant applications, such as streaming services, may be segregated from delay sensitive data packets such that at least some of the delay tolerant data packets are offloaded to other base stations (e.g., 502*b-c*) in the network 500. If the segregated data distribution plan meets the desired QoS objectives, the NTC server 26 will utilize the data distribution plan including one or more of the subsequent stations (e.g., 502*b-c*) to provide data packets to the mobile devices via the Uu interface 512 at stage 1510.

At stage 1512, if the available Uu service on subsequent parts of the route is not satisfactory, the method includes determining if satisfactory PC5 service is available in subsequent parts of the planned route. The NTC server 26 is a means for determining if there are satisfactory PC5 services available in subsequent parts of the planned route. The NTC server 26 may utilize the handler functions previously described to determine the service availability/network status at stations along the planned route. The evaluation of the stations may include independent station such as the RSUs 504*a-b*. As previously described, the data packets associated with delay tolerant applications, such as streaming services, may be segregated from delay sensitive data packets such that at least some of the delay tolerant data packets are offloaded to the RSUs 504*a-b*. If the segregated data distribution plan based on the PC5 interface 514 meets the desired QoS objectives, the NTC server 26 will utilize the data distribution plan including one or more of the subsequent RSUs 504*a-b* to provide data packets to the mobile devices via the PC5 interface 514 at stage 1514.

At stage 1516, if the available PC5 service on subsequent parts of the route is not satisfactory, the method includes determining if satisfactory combinations of Uu and PC5 service is available in subsequent parts of the planned route. The NTC server 26 is a means for determining if there are satisfactory Uu and PC5 services available in subsequent parts of the planned route. The NTC server 26 may utilize the handler functions previously described to generate a data distribution plan 900 based on the service availability/network status at all of the stations along the planned route, including combinations of base stations 502*a-c* and RSUs 504*a-b*. As previously described, the data packets may be segregated based on delay sensitivity, or other performance requirements, and the NTC server 26 will utilize the data distribution plan 900 including the base stations 502*a-c* and the RSUs 504*a-b* to provide data packets to the mobile devices via the Uu and PC5 interfaces 512, 514 at stage 1518.

Figure 16:
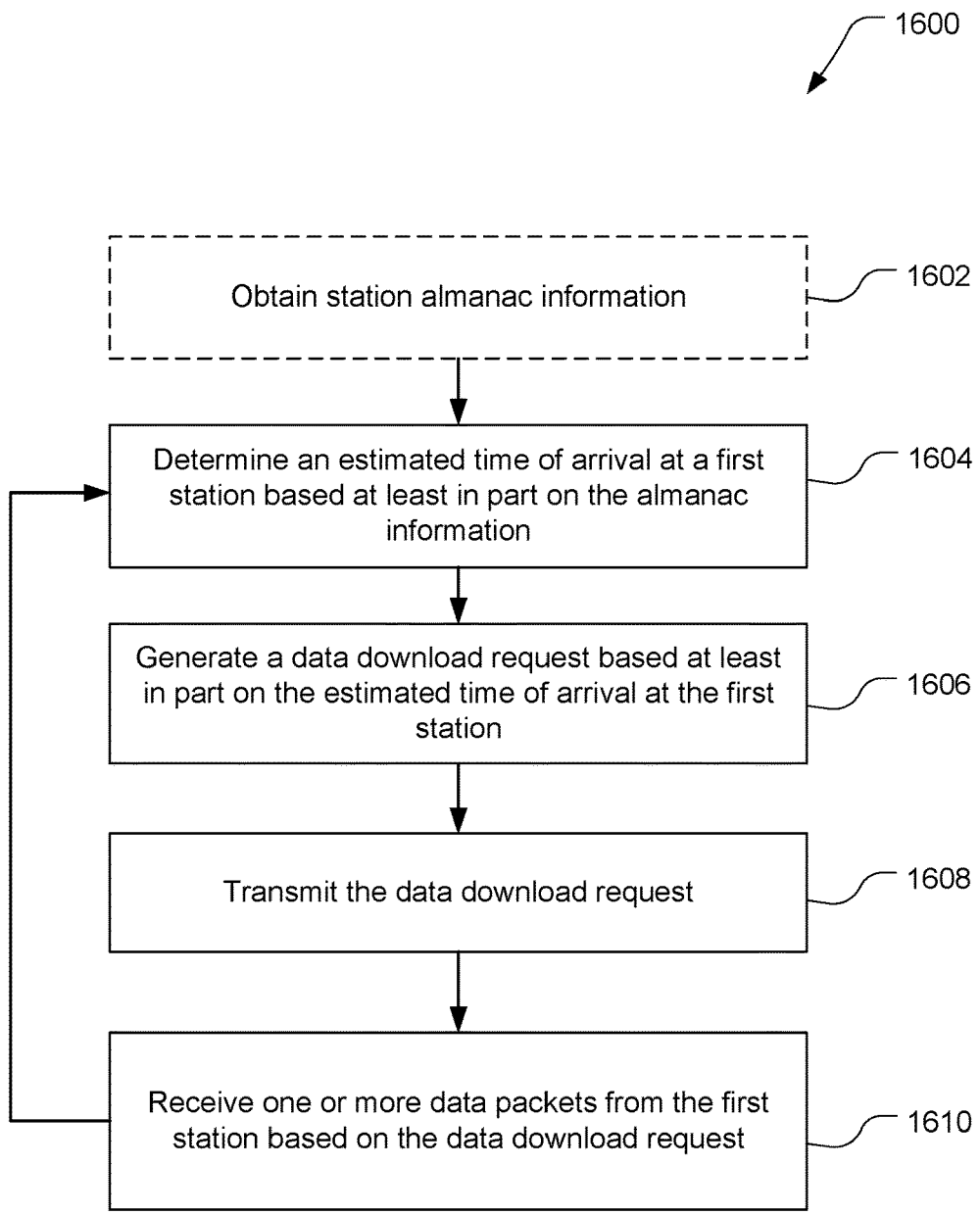
FIG. 16 is a block flow diagram of an example method for downloading data on a mobile device.

Referring to FIG. 16, with further reference to FIGS. 1-11, a method 1600 for downloading data on a mobile device includes the stages shown. The method 1600 is, however, an example and not limiting. The method 1600 may be altered, e.g., by having stages added, removed, rearranged, combined, performed concurrently, and/or having single stages split into multiple stages. For example, obtaining station almanac information at stage 1602 is optional as a UE may have the station almanac information stored locally. Still other alterations to the method 1600 as shown and described are possible.

At stage 1602, the method optionally includes obtaining station almanac information. The UE 200 is a means for obtaining the station almanac information. In an example, the UE 200 may receive almanac data from a BS 21 or an RSU 20. The almanac information may include the locations of base stations and RSUs that are proximate (e.g., within 20 miles) to the location of the UE 200. The almanac information may include other information elements such as frequencies or channels, station identifications, coverage areas, and other parameters to enable the UE 200 to communicate with the station. The almanac information may be provided via out-of-band methods such as via a wired or wireless connection to the network. In an example, third parties (e.g., Google, Amazon, Verizon, etc.) may aggregate crowd sourced station information to generate an almanac and the UE 200 may receive the almanac information via a user account or a subscription service.

At stage 1604, the method includes determining an estimated time of arrival at a first station based at least in part on the almanac information. The UE 200 is a means for determining an estimated time of arrival. The almanac information may include the geographic coordinates for stations proximate to the UE 200, and the UE 200 may utilize the geographic coordinates to estimate a coverage area and an estimated time that the UE 200 will enter the coverage area based on current motion parameters (e.g., direction and speed). The estimated time of arrival to the next closest RSU, for example, may be considered a gap duration in that the UE 200 may assume that it will not have an opportunity to exchange data with an RSU during the gap duration. The UE 200 may be configured to use third party routing services, which may account for traffic and other delays, to determine the estimated time of arrival. As used herein, arrival at a station means arrival at the coverage area of the station.

At stage 1606, the method includes generating a data download request based at least in part on the estimated time of arrival at the first station. The UE 200 is a means for generating the data download request. The data download request is based, in part, on the nature of the data the UE 200 is seeking. For media files that are consumed at a rate based in part on the fidelity of the audio and the image quality (e.g., screen resolution, frame rate, etc.), the data download request may be based on the amount of media data that can be consumed (e.g., viewed, heard) during a gap duration. Other media, such as websites, may be defined based on the layers or levels of content. In general, the concept of the data download request is to determine how much data will be utilized, possibly with additional data to address unpredicted delays, during the gap duration between short range high bandwidth communication opportunities in an effort to reduce network traffic on relatively longer range and lower bandwidth assets. The data download request may include, for example, file information associated with a content server to enable an RSU to obtain a portion of a media file and transmit the media file to the UE. In an embodiment, the download request may include a priority value and the RSU may be configured to provide data based in part on the priority value. The priority value may be, for example, based in part on an amount of unconsumed media on the UE 200. A UE with a low amount of remaining view time for a media file may have a higher priority. In an example, the UE may attempt to download as much data as possible (e.g., the entire media file) as the first station.

At stage 1608, the method includes transmitting the data download request. The UE 200 is a means for transmitting the data download request. The UE 200 may transmit the data download request to a RSU that the UE is currently communicating with, and that RSU may provide data in response to the request via a PC5 or other D2D sidelink interface. In an example, the data download request may include an indication of a station to provide the requested data download. That is, the UE 200 may indicate an anticipated RSU (or other station) along a route, and the anticipated RSU will provide the requested data when the UE 200 is in communications range. In another example, the UE 200 may request the data download from a base station via a Uu interface.

At stage 1610, the method includes receiving one or more data packets from the first station based on the data download request. The UE 200 is a means for receiving the one or more data packets. The data packets may be a portion of a media file, or other desired data, as indicated in the data download request transmitted at stage 1608. The UE 200 may be configured to store the data packets in a cache or other local memory location such that an application executing on the UE 200 (e.g., media player, browser, book reader) may access the stored data. In an example, the amount of data received may be more or less than requested and the UE 200 may adjust subsequent requests based on the amount of the data that is being consumed. The method 1600 may iterate back to stage 1604 as the UE 200 continues to travel from one station to another such that each iteration may be based on the time and capabilities of the next station and the amount of data requested.

Figure 17:
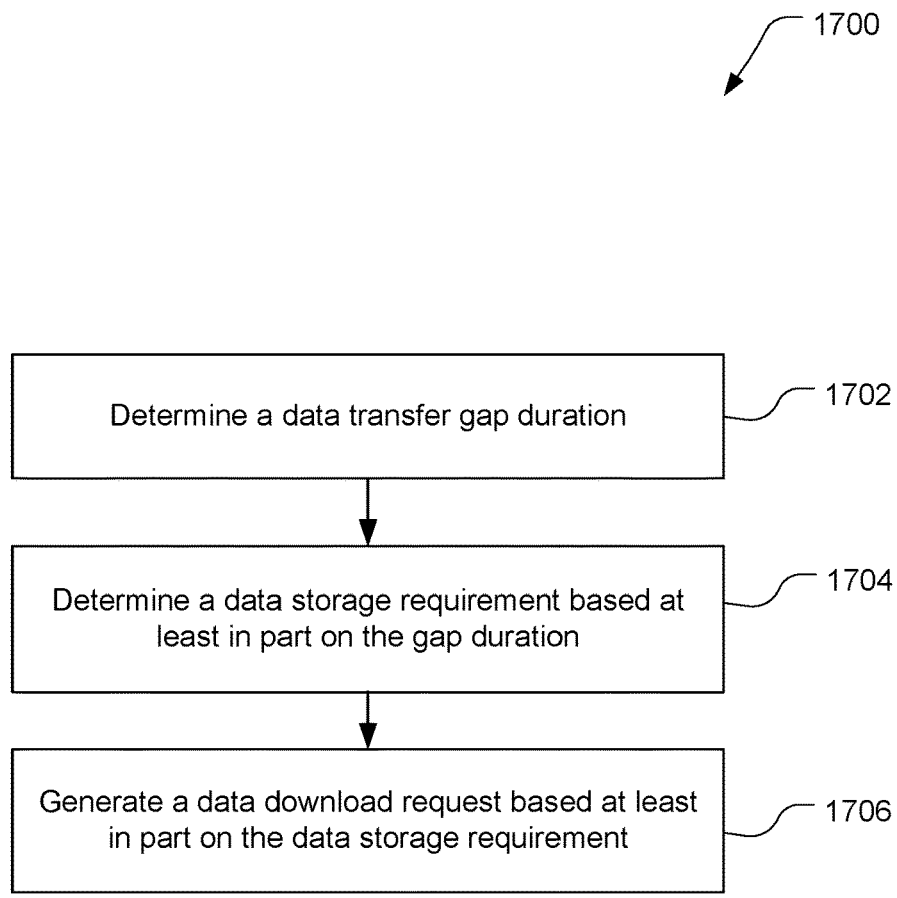
FIG. 17 is a block flow diagram of an example method for generating a preemptive data download request.

Referring to FIG. 17, with further reference to FIGS. 1-11, a method 1700 for generating a preemptive data download request includes the stages shown. The method 1700 is, however, an example and not limiting. The method 1700 may be altered, e.g., by having stages added, removed, rearranged, combined, performed concurrently, and/or having single stages split into multiple stages. Still other alterations to the method 1700 as shown and described are possible.

At stage 1702, the method includes determining a data transfer gap duration. The UE 200 is a means for determining the data transfer gap duration. The UE 200 may be located in a position that is out of communication range of a station, but the intended motion of the UE 200 will place the UE 200 within communication range of the station. In general, the data transfer gap duration is the amount of time the UE 200 will be out of communication range of the station. The UE 200 may determine the range to the coverage area of a station based on a current position estimate and the known location of the station. For example, the UE 200 may obtain almanac data including the locations of one or more stations and then determine an estimated time of arrival to the coverage area. The UE 200 may utilize navigation data such as location, course, speed and map data to determine a gap duration. In an example, a route planning application may provide an estimated travel time to a location and the data transfer gap duration may be based on the estimated travel time. The data transfer gap duration may be based on the proximity and availability of stations to accommodate a data transfer request. In an urban environment, the data transfer gap duration may be in the range of 1-10 minutes. The durations may be longer outside of urban areas where the distances between stations may be greater.

At stage 1704, the method includes determining a data storage requirement based at least in part on the gap duration. The UE 200 is a means for determining the data storage requirement. In an example, the data storage requirement is based on the amount of data that may be consumed by an application. For example, media consumption (e.g., listening, viewing) may consume data at bit rates in the range of 22 kbps to 1 Mbps, and the corresponding file size of thirty minutes of consumption may be in the range of 4.8 MB to 220 MB. Other bit rates and file sizes may be used based on the quality of the media. In an example, the data storage requirement may be based on the bit rate, the data transfer gap duration, and the media file type. For example, for a Windows Media file (i.e., .asf), the data storage requirement may be estimated as:

$$\text{File size (MB)} = (\text{Encoded bit rate (in Kbps)} * \text{gap duration (in secs)})/8192 \quad (2)$$

Other formulas for other data file types may be used. General file size guidelines may also be used. For example, for MPEG-2 compressed video, one hour of video content may utilize approximately 1 GB of storage. The proportional estimate as described in equation (1) may also be used to determine the data storage requirement based on the gap duration. The data storage requirement may be increased by a fixed percentage (e.g., 5%, 10%, 20% etc.) to account for potential delays in transit time. In an example, the UE may attempt to download as much data as possible (e.g., the entire media file) regardless of the gap duration. That is, the UE may be capable of receiving more data while proximate to one station which may obviate the need for subsequent data downloads from other stations.

At stage 1706, the method includes generating a data download request based at least in part on the data storage requirement. The UE 200 is a means for generating a download request. The data storage requirement is based in part on the nature of the data the UE 200 is seeking. The data download request may include, for example, file information associated with a content server to enable an RSU or BS to obtain a portion of a media file equal to the data storage requirement, and then transmit that portion of the media file to the UE 200. In an embodiment, the download request may include a priority value and the RSU may be configured to provide data based in part on the priority value. The priority value may be, for example, based in part on an amount of unconsumed media on the UE 200. For example, referring to FIG. 12, when the majority of the media file on the UE 200 has been consumed, the data download request may indicate a higher priority.

Figure 18:
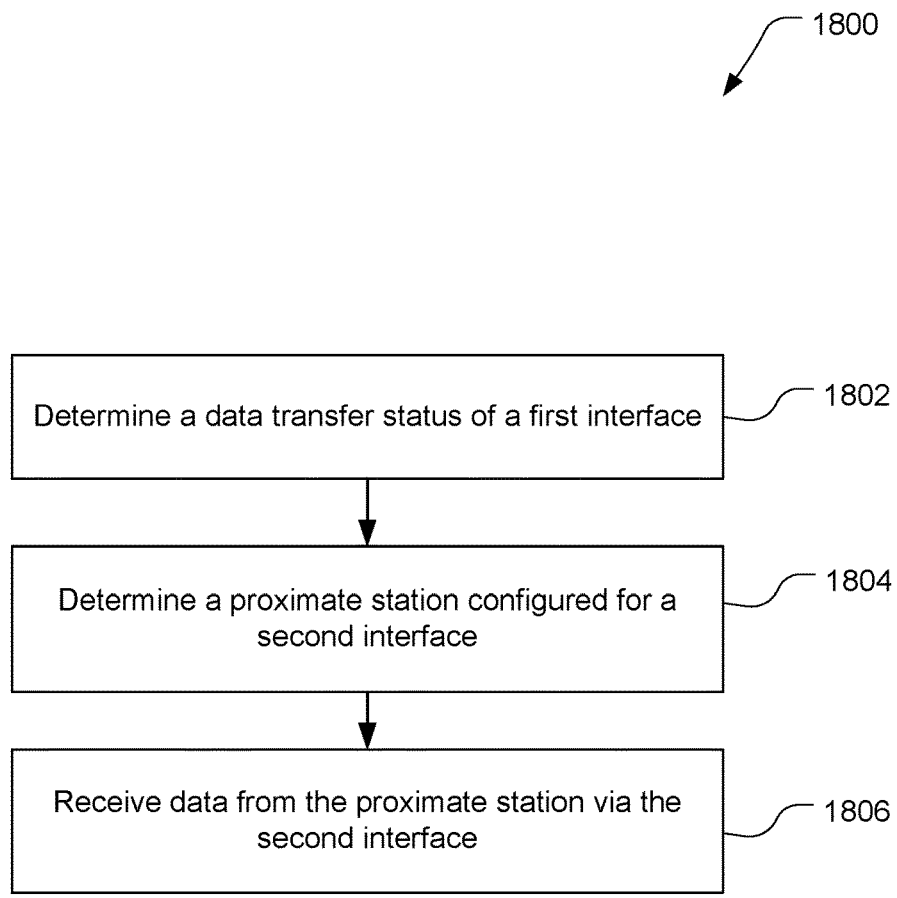
FIG. 18 is a block flow diagram of an example method for determining a wireless interface.

Referring to FIG. 18, with further reference to FIGS. 1-11, a method 1800 for determining a wireless interface includes the stages shown. The method 1800 is, however, an example and not limiting. The method 1800 may be altered, e.g., by having stages added, removed, rearranged, combined, performed concurrently, and/or having single stages split into multiple stages. Still other alterations to the method 1800 as shown and described are possible.

At stage 1802, the method includes determining a data transfer status of a first interface. The UE 200 is a means for determining a data transfer status. The data transfer status may be based on the data transfer rate and/or latency detected by the UE. In an example, referring to FIG. 10, the UE 1004 may be in communication with the gNB 1006a via a Uu interface at a first data transfer rate. As network demands increase, the gNB 1006a may be configured to reduce the data transfer rate, or may be unable to maintain the first data transfer rate with the UE 1004. The UE 1004 may also detect increased latency in data exchanges with the gNB 1006a. In an example, gNB 1006a may provide an indication of a data transfer status (e.g., via System Information Blocks (SIBs), or other messaging protocols).

At stage 1804, the method includes determining a proximate station configured for a second interface. The UE 200 is a means for determining a proximate station. Referring to FIG. 10, the UE 1004 may obtain almanac data including the locations of proximate stations and their corresponding communications capabilities. The almanac data may indicate if a station is configured for sidelink communications, such as via the PC5 interface. In an example, the UE 1004 may determine a current location based on terrestrial or satellite navigation techniques, and determine that the first RSU 1008a is a proximate station. Other stations may also be selected based on range and communication capabilities. In general, the UE 1004 may select a proximate station that is capable of providing a data transfer rate that is higher than the current data transfer status determined at stage 1802.

At stage 1806, the method includes receiving data from the proximate station via the second interface. The UE 200 is a means for receiving the data via the second interface. Continuing the example, the UE 1004 may be within communication range of the first RSU 1008a and may receive data packets from the first RSU 1008a via a PC5 interface. The UE 1004 may be configured to maintain a connection with the gNB 1006a via the Uu interface while receiving data via the PC5 interface from the first RSU 1008a (i.e., the PC5 interface may augment the Uu interface). In an example, the UE 1004 may switch over completely to the PC5 interface.

Figure 19:
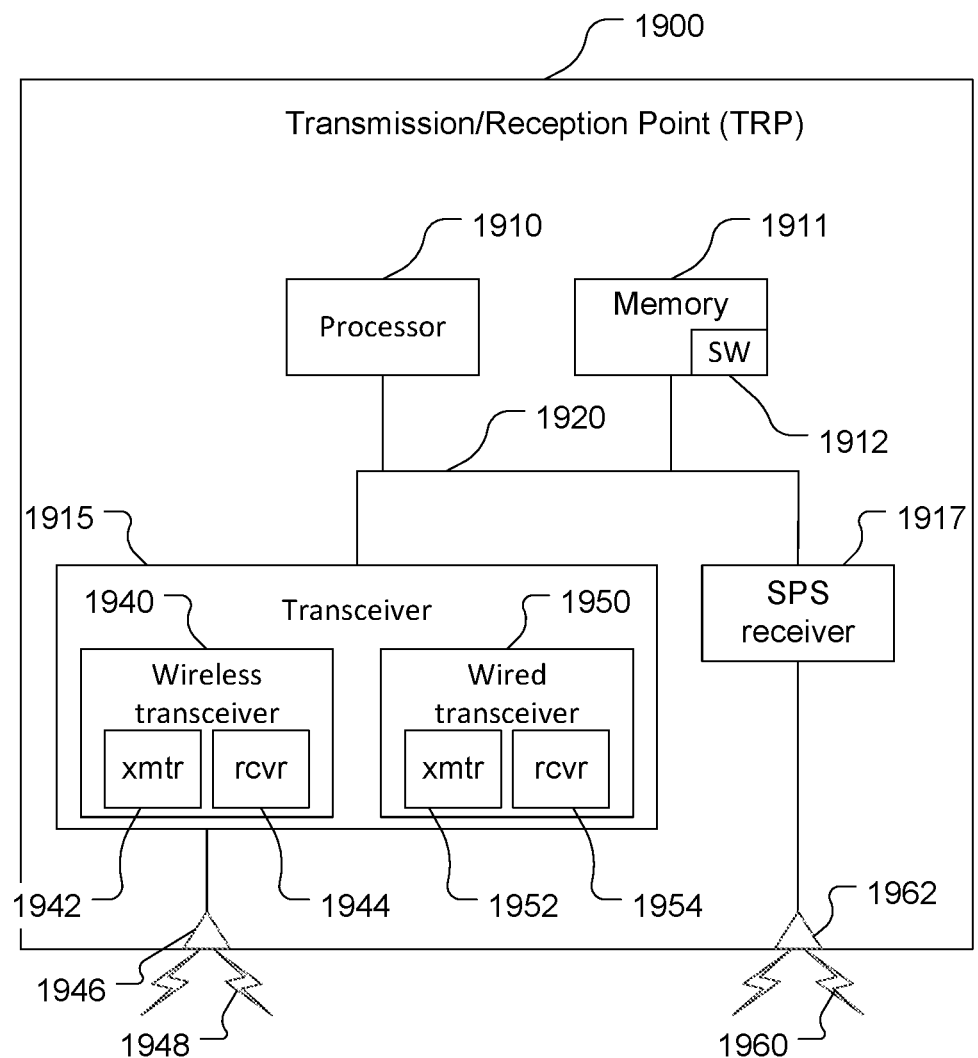
FIG. 19 is a block diagram of components of an example transmission/reception point.

Referring to FIG. 19, a block diagram of components of an example transmission/reception point 1900 is shown. The TRP 1900 is an example of the BTSs 21, 24, 502a-c, 1006a-b and comprises a computing platform including a processor 1910, memory 1911 including software (SW) 1912, a transceiver 1915, and (optionally) an SPS receiver 1917. The processor 1910, the memory 1911, the transceiver 1915, and the SPS receiver 1917 may be communicatively coupled to each other by a bus 1920 (which may be configured, e.g., for optical and/or electrical communication). One or more of the shown apparatus (e.g., a wireless interface and/or the SPS receiver 1917) may be omitted from the TRP 1900. The SPS receiver 1917 may be configured similarly to the SPS receiver 217 to be capable of receiving and acquiring SPS signals 1960 via an SPS antenna 1962. The processor 1910 may include one or more intelligent hardware devices, e.g., a central processing unit (CPU), a microcontroller, an application specific integrated circuit (ASIC), etc. The processor 1910 may comprise multiple processors (e.g., including a general-purpose/application processor, a DSP, a modem processor, a video processor, and/or a sensor processor as shown in FIG. 2). The memory 1911 is a non-transitory storage medium that may include random access memory (RAM)), flash memory, disc memory, and/or read-only memory (ROM), etc. The memory 1911 stores the software 1912 which may be processor-readable, processor-executable software code containing instructions that are configured to, when executed, cause the processor 1910 to perform various functions described herein. Alternatively, the software 1912 may not be directly executable by the processor 1910 but may be configured to cause the processor 1910, e.g., when compiled and executed, to perform the functions. The description may refer to the processor 1910 performing a function, but this includes other implementations such as where the processor 1910 executes software and/or firmware. The description may refer to the processor 1910 performing a function as shorthand for one or more of the processors contained in the processor 1910 performing the function. The description may refer to the TRP 1900 performing a function as shorthand for one or more appropriate components of the TRP 1900 (and thus of one of the BTSs 21, 24, 502a-c, 1006a-b) performing the function. The processor 1910 may include a memory with stored instructions in addition to and/or instead of the memory 1911. Functionality of the processor 1910 is discussed more fully below.

The transceiver 1915 may include a wireless transceiver 1940 and a wired transceiver 1950 configured to communicate with other devices through wireless connections and wired connections, respectively. For example, the wireless transceiver 1940 may include a transmitter 1942 and receiver 1944 coupled to one or more antennas 1946 for transmitting (e.g., on one or more uplink channels) and/or receiving (e.g., on one or more downlink channels) wireless signals 1948 and transducing signals from the wireless signals 1948 to wired (e.g., electrical and/or optical) signals and from wired (e.g., electrical and/or optical) signals to the wireless signals 1948. Thus, the transmitter 1942 may include multiple transmitters that may be discrete components or combined/integrated components, and/or the receiver 1944 may include multiple receivers that may be discrete components or combined/integrated components. The wireless transceiver 1940 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (Uu), IEEE 802.11 (including IEEE 802.11p), WiFi, WiFi Direct (WiFi-D), Bluetooth®, Zigbee etc. The wired transceiver 1950 may include a transmitter 1952 and a receiver 1954 configured for wired communication, e.g., with the network 14 to send communications to, and receive communications from, the server 16, for example. The transmitter 1952 may include multiple transmitters that may be discrete components or combined/integrated components, and/or the receiver 1954 may include multiple receivers that may be discrete components or combined/integrated components. The wired transceiver 1950 may be configured, e.g., for optical communication and/or electrical communication.

The configuration of the TRP 1900 shown in FIG. 19 is an example and not limiting of the various embodiments, or as to the claimed embodiments, and as the configuration and/or embodiments that may be utilized. For example, the description herein discusses that the TRP 1900 is configured to perform or performs several functions, but one or more of these functions may be performed by the server 16 and/or the UE 200 (i.e., the server 16 and/or the UE 200 may be configured to perform one or more of these functions).

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the RSU 20 may be performed outside of the RSU 20 such as by the server 16 and/or another RSU.

In an example a method for providing data to a mobile device according to the disclosure includes determining planned route information for a plurality of mobile devices, receiving a data download request associated one or more of the plurality of mobile devices, determining data delivery options based on the data download request and the planned route information for the one or more of the plurality of mobile devices, segregating and planning a data distribution to each of the one or more of the plurality of mobile devices based on the data delivery options, and providing data to each of the one or more of the plurality of mobile devices based on a data distribution plan and a current location of the mobile device.

Implementations of such method may include one or more of the following features. The plurality of mobile devices may be disposed in a multi-passenger vehicle. The planned route information may include determining a route of the multi-passenger vehicle. The plurality of mobile devices may be in a dynamic cluster of vehicles. The plurality of mobile devices may include one or more mobile devices in a dynamic cluster of vehicles and one or more mobile devices in a multi-passenger vehicle. Determining the planned route information may include receiving a route from a navigation application executing on at least one of the plurality of mobile devices. Determining the data delivery options may include determining service availability for one or more stations proximate to a planned route included in the planned route information. Segregating and planning the data distribution may include classifying at least one data packet as a delay tolerant data packet and scheduling a delivery of the delay tolerant data packet to a station proximate to a location in the planned route information at a future time. The station may be a roadside unit and the mobile device will be proximate to the roadside unit at the future time. Segregating and planning the data distribution may include determining a plurality of time periods, wherein each of the plurality of time periods is associated with a coverage area of one or more stations proximate to a location in the planned route information. Providing the data to each of the one or more of the plurality of mobile devices may include providing one or more data packets to the mobile device with a cellular base station, and providing one or more data packets to the mobile device with an independent station. The cellular base station and the independent station may provide their respective one or more data packets to the mobile device concurrently. One or more data packets provided to the mobile device with the cellular base station may utilize a Uu interface, and the one or more data packets provided to the mobile device with the independent station may utilize a sidelink. One or more data packets provided to the mobile device with the independent station may utilize a PC5 interface. The independent station may have a higher data transfer rate than the cellular base station. The independent station may have a greater available capacity than the cellular base station.

In an example, a method for receiving data packets with a mobile device according to the disclosure includes providing route information and a data download request to a network traffic coordinator server, such that the route information is associated with at least a first location and a second location, receiving a first set of data packets based on the data download request from a first transmitter at the first location, such that the first transmitter is part of a cellular network, and receiving a second set of data packets based on the data download request from a second transmitter at the second location, such that the second transmitter is independent of the cellular network and the second set of data packets are received via a sidelink.

Implementations of such a method may include one or more of the following features. The mobile device may be one of a plurality of mobile devices disposed in a multi-passenger vehicle. Providing the route information may include providing the route information for the multi-passenger vehicle. The mobile device may be one of a plurality of mobile devices in a dynamic cluster of vehicles. Providing the route information may include providing a route from a navigation application executing on the mobile device. The first set of data packets and the second set of data packets may be associated with a delay tolerant application executing on the mobile device. The first set of data packets and the second set of data packets may be associated with a media file. The second transmitter may have a higher data transfer rate than the first transmitter. The second transmitter may have a greater available capacity than the first transmitter. The first transmitter may utilize a Uu interface and the second transmitter may utilize a D2D link. The D2D link may include a PC5 interface.

An example method for downloading data on a mobile device according to the disclosure includes receiving a network status indication from a first station, determining a second station based at least in part on the network status indication and a current location of the mobile device, determining an estimated coverage area of the second station, generating a data download request based at least in part on the coverage area the second station, transmitting the data download request, and receiving one or more data packets from the second station based on the data download request.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

"About" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

Having described several example configurations, various modifications, alternative constructions, and equivalents may be used without departing from the spirit of the disclosure. Also, various of operations may be undertaken before, during, or after the above elements are considered.

The invention claimed is:

1. A method for downloading data on a mobile device, comprising:
   determining an estimated time of arrival at a first station based at least in part on almanac information;
   generating a data download request based at least in part on the estimated time of arrival at the first station and a data transfer rate associated with the first station;
   transmitting the data download request to a second station; and
   receiving one or more data packets from the first station based on the data download request, wherein the data transfer rate associated with the first station is higher than a data transfer rate associated with the second station.

2. The method of claim 1 further comprising obtaining the almanac information from a network.

3. The method of claim 1 further comprising:
   determining a data transfer gap duration based at least in part on the estimated time of arrival at the first station;
   determining a data storage requirement based at least in part on the gap duration; and
   generating the data download request based at least in part on the data storage requirement.

4. The method of claim 3 wherein the data storage requirement is based at least in part on an amount of data consumed by an application executing on the mobile device.

5. The method of claim 4 wherein the amount of data consumed by the application is based on a bit rate associated with a file type.

6. The method of claim 1 wherein the data download request is transmitted via a cellular network.

7. The method of claim 1 wherein the data download request is transmitted via a Uu interface.

8. The method of claim 1 wherein the data download request is transmitted via a sidelink interface.

9. The method of claim 1 wherein the one or more data packets are received via a PC5 interface.

10. The method of claim 1 wherein the one or more data packets are at least a first portion of a first media file.

11. The method of claim 10 further comprising:
determining an estimated time of arrival at a third station based at least in part on the almanac information;
generating a second data download request based at least in part on the estimated time of arrival at the third station;
transmitting the second data download request; and
receiving one or more data packets from the third station based on the second data download request, wherein the one or more data packets are at least a second portion of the first media file.

12. The method of claim 11 wherein the second data download request is transmitted to the second station.

13. The method of claim 1 wherein the data download request includes a priority value.

14. The method of claim 13 wherein the priority value is based at least in part on an amount of unconsumed media file on the mobile device.

15. The method of claim 1 further comprising:
storing the one or more data packets in a memory; and
displaying an indicator based on the one or more data packets stored in the memory.

16. An apparatus, comprising:
a memory;
at least one transceiver;
at least one processor communicatively coupled to the memory and the at least one transceiver and configured to:
determine an estimated time of arrival at a first station based at least in part on almanac information;
generate a data download request based at least in part on the estimated time of arrival at the first station and a data transfer rate associated with the first station;
transmit the data download request to a second station; and
receive one or more data packets from the first station based on the data download request, wherein the data transfer rate associated with the first station is higher than a data transfer rate associated with the second station.

17. The apparatus of claim 16 wherein the at least one processor is further configured to obtain the almanac information from a network.

18. The apparatus of claim 16 wherein the at least one processor is further configured to:
determine a data transfer gap duration based at least in part on the estimated time of arrival at the first station;
determine a data storage requirement based at least in part on the gap duration; and
generate the data download request based at least in part on the data storage requirement.

19. The apparatus of claim 18 wherein the data storage requirement is based at least in part on an amount of data consumed by an application executing on the apparatus.

20. The apparatus of claim 19 wherein the amount of data consumed by the application is based on a bit rate associated with a file type.

21. The apparatus of claim 16 wherein the at least one processor is further configured to transmit the data download request via a cellular network.

22. The apparatus of claim 16 wherein the at least one processor is further configured to transmit the data download request via a Uu interface.

23. The apparatus of claim 16 wherein the at least one processor is further configured to transmit the data download request via a sidelink interface.

24. The apparatus of claim 16 wherein the at least one processor is further configured to receive the one or more data packets via a PC5 interface.

25. The apparatus of claim 16 wherein the one or more data packets are at least a first portion of a first media file.

26. The apparatus of claim 25 wherein the at least one processor is further configured to:
determine an estimated time of arrival at a third station based at least in part on the almanac information;
generate a second data download request based at least in part on the estimated time of arrival at the third station;
transmit the second data download request; and
receive one or more data packets from the third station based on the second data download request, wherein the one or more data packets are at least a second portion of the first media file.

27. The apparatus of claim 26 wherein the at least one processor is further configured to transmit the second data download request to the second station.

28. The apparatus of claim 16 wherein the data download request includes a priority value.

29. The apparatus of claim 28 wherein the priority value is based at least in part on an amount of unconsumed media file on the apparatus.

30. The apparatus of claim 16 wherein the at least one processor is further configured to:
store the one or more data packets in the memory; and
display an indicator based on the one or more data packets stored in the memory.

31. An apparatus for downloading data on a mobile device, comprising:
means for determining an estimated time of arrival at a first station based at least in part on almanac information;
means for generating a data download request based at least in part on the estimated time of arrival at the first station and a data transfer rate associated with the first station;
means for transmitting the data download request to a second station; and
means for receiving one or more data packets from the first station based on the data download request, wherein the data transfer rate associated with the first station is higher than a data transfer rate associated with the second station.

32. The apparatus of claim 31 further comprising:
means for determining a data transfer gap duration based at least in part on the estimated time of arrival at the first station;
means for determining a data storage requirement based at least in part on the gap duration; and
means for generating the data download request based at least in part on the data storage requirement.

33. The apparatus of claim 32 wherein the data storage requirement is based at least in part on an amount of data consumed by an application executing on the mobile device.

34. The apparatus of claim 33 wherein the amount of data consumed by the application is based on a bit rate associated with a file type.

35. A non-transitory processor-readable storage medium comprising processor-readable instructions configured to cause one or more processors to download data on a mobile device, comprising:
- code for determining an estimated time of arrival at a first station based at least in part on almanac information;
- code for generating a data download request based at least in part on the estimated time of arrival at the first station and a data transfer rate associated with the first station;
- code for transmitting the data download request to a second station; and
- code for receiving one or more data packets from the first station based on the data download request, wherein the data transfer rate associated with the first station is higher than a data transfer rate associated with the second station.

36. The non-transitory processor-readable storage medium of claim 35 further comprising:
- code for determining a data transfer gap duration based at least in part on the estimated time of arrival at the first station;
- code for determining a data storage requirement based at least in part on the gap duration; and
- code for generating the data download request based at least in part on the data storage requirement.

37. The non-transitory processor-readable storage medium of claim 35 wherein the one or more data packets are at least a first portion of a first media file.

38. The non-transitory processor-readable storage medium of claim 37 further comprising:
- code for determining an estimated time of arrival at a third station based at least in part on the almanac information;
- code for generating a second data download request based at least in part on the estimated time of arrival at the third station;
- code for transmitting the second data download request; and
- code for receiving one or more data packets from the third station based on the second data download request, wherein the one or more data packets are at least a second portion of the first media file.

* * * * *